(12) United States Patent  
Gagne et al.

(10) Patent No.: US 8,950,993 B2  
(45) Date of Patent: Feb. 10, 2015

(54) SPEED NUT AND ASSEMBLY

(71) Applicant: Brainwave Research Corporation, Woodbridge (CA)

(72) Inventors: Jean-Guy Gagne, Etobicoke (CA); James W. Rodgers, Toronto (CA)

(73) Assignee: Brainwave Research Corporation, Woodbridge (CA)

( * ) Notice: Subject to any disclaimer, the term of this patent is extended or adjusted under 35 U.S.C. 154(b) by 0 days.

(21) Appl. No.: 13/875,949

(22) Filed: May 2, 2013

(65) Prior Publication Data

US 2013/0294867 A1 Nov. 7, 2013

Related U.S. Application Data

(60) Provisional application No. 61/641,530, filed on May 2, 2012.

(51) Int. Cl.  
 *F16B 37/08* (2006.01)

(52) U.S. Cl.  
 CPC .............. *F16B 37/08* (2013.01); *F16B 37/0842* (2013.01)  
 USPC .......................................................... 411/433

(58) Field of Classification Search  
 CPC .... F16B 31/04; F16B 37/002; F16B 37/0821; F16B 37/0842; F16B 37/0857; F16B 37/0864; F16B 37/0885; F16B 37/0892

USPC ......... 411/429, 430, 432, 433, 436, 511, 523, 411/527

See application file for complete search history.

(56) References Cited

U.S. PATENT DOCUMENTS

| | | | |
|---|---|---|---|
| RE21,769 E * | 4/1941 | Tinnerman | 411/524 |
| RE22,049 E * | 3/1942 | Tinnerman | 411/524 |
| 2,401,672 A * | 6/1946 | Tinnerman | 411/437 |
| 4,714,392 A * | 12/1987 | Muller et al. | 411/175 |
| 4,828,444 A * | 5/1989 | Oshida | 411/437 |
| 4,999,019 A * | 3/1991 | Kraus | 411/512 |
| 5,098,242 A * | 3/1992 | Schaty | 411/437 |
| 5,598,994 A * | 2/1997 | Olewinski et al. | 248/73 |
| 5,785,477 A * | 7/1998 | McGuffey et al. | 411/432 |
| 6,287,065 B1 * | 9/2001 | Berlin | 411/340 |
| 6,672,814 B1 * | 1/2004 | Kotlarski | 411/527 |
| 7,182,563 B2 * | 2/2007 | Wimmer et al. | 411/174 |
| 7,891,151 B2 * | 2/2011 | Sano | 52/506.05 |
| 7,950,886 B2 * | 5/2011 | Siegal | 411/107 |
| 2005/0129481 A1 * | 6/2005 | Wimmer et al. | 411/175 |
| 2009/0067948 A1 * | 3/2009 | Chung | 411/429 |
| 2013/0071205 A1 * | 3/2013 | Kuehn | 411/511 |

* cited by examiner

*Primary Examiner* — Roberta Delisle  
(74) *Attorney, Agent, or Firm* — Ditthavong & Steiner, P.C.

(57) ABSTRACT

A fastener device and assembly comprises segmented arms of rectangular cross section that extend inwardly from a central opening in a surface of the device body. A distal end portion of each segment arm comprises an internally threaded portion, to collectively form a single thread engageable with an externally threaded fastener. Centering portions enhance alignment of the device when applied to the externally threaded fastener.

35 Claims, 32 Drawing Sheets

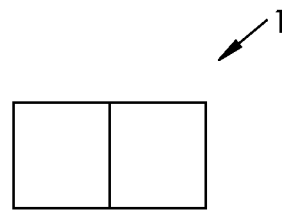
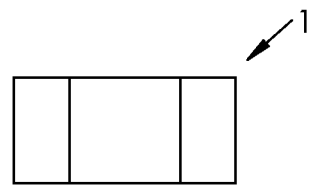
FIG. 1a
FIG. 1b
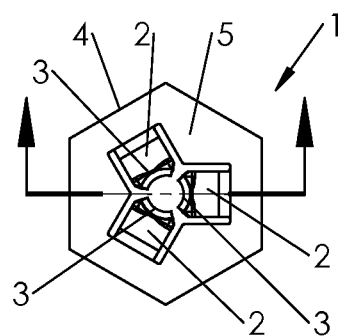
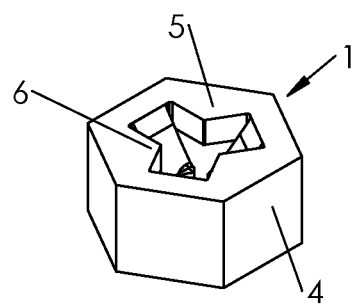
FIG. 1c
FIG. 1d
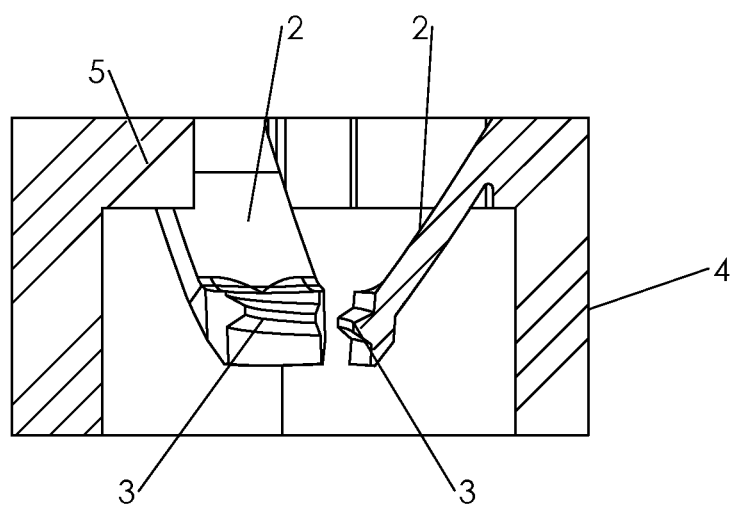
FIG. 1e

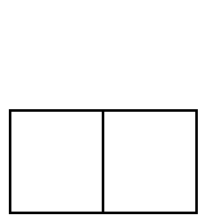
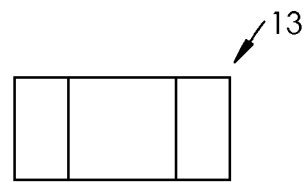
FIG. 3a  FIG. 3b
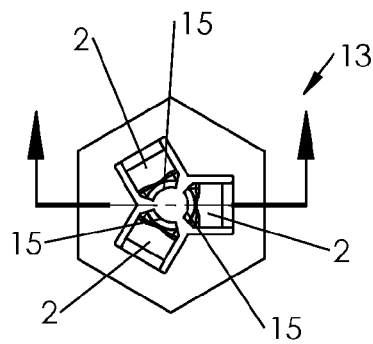
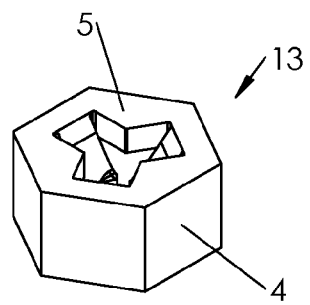
FIG. 3c  FIG. 3d
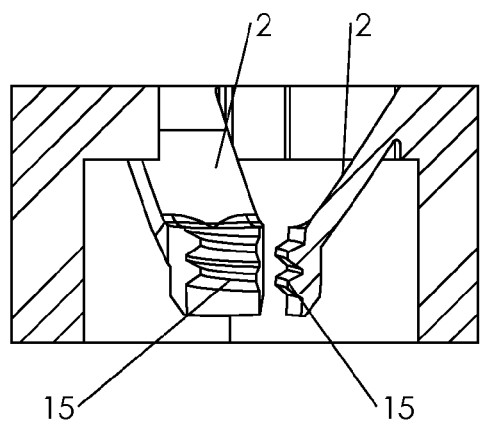
FIG. 3e

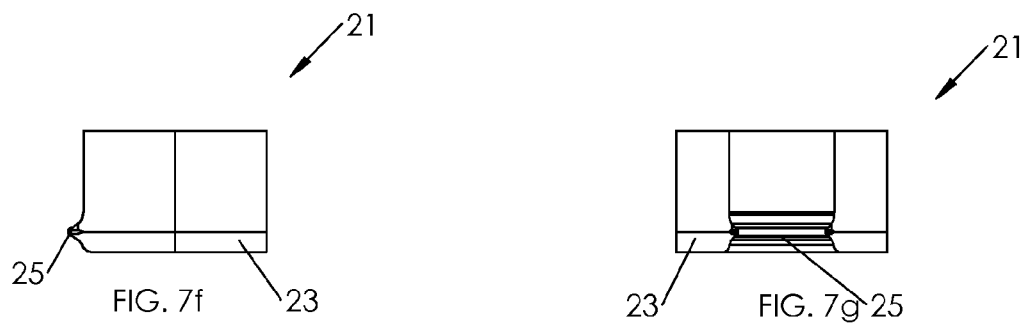
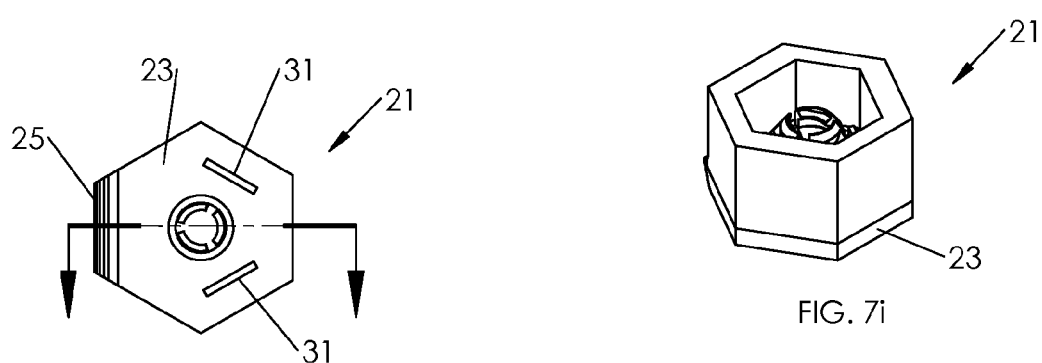
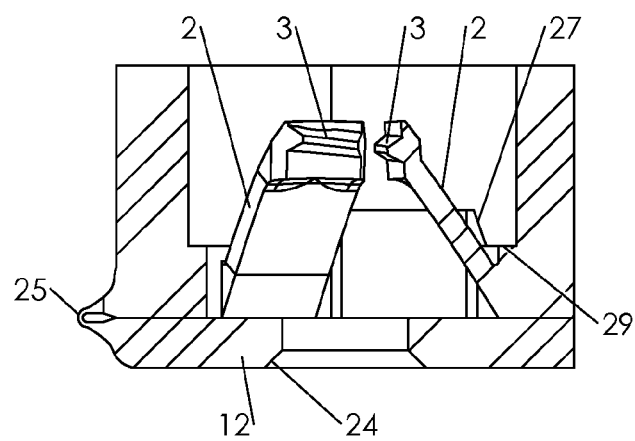

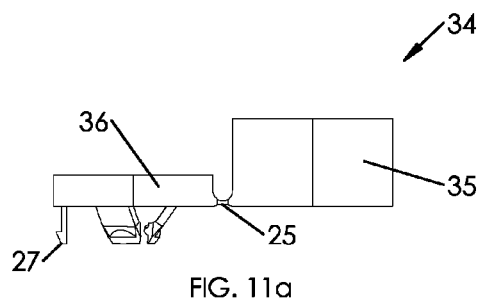
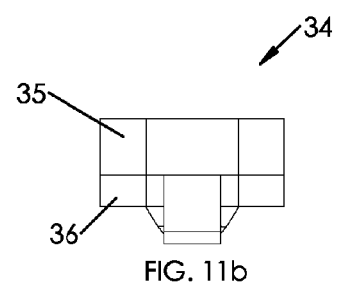
FIG. 11a  FIG. 11b
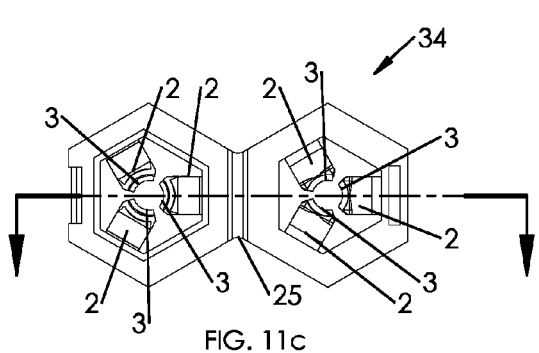
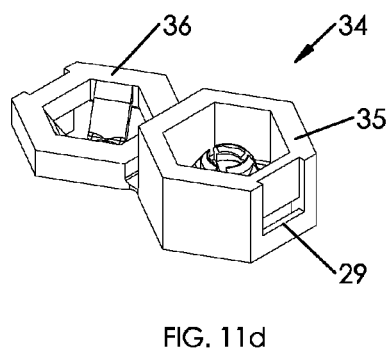
FIG. 11c  FIG. 11d
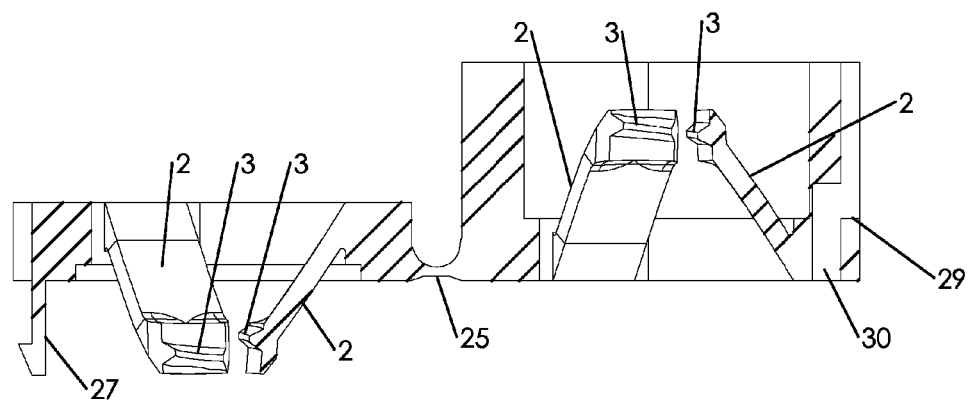
FIG. 11e

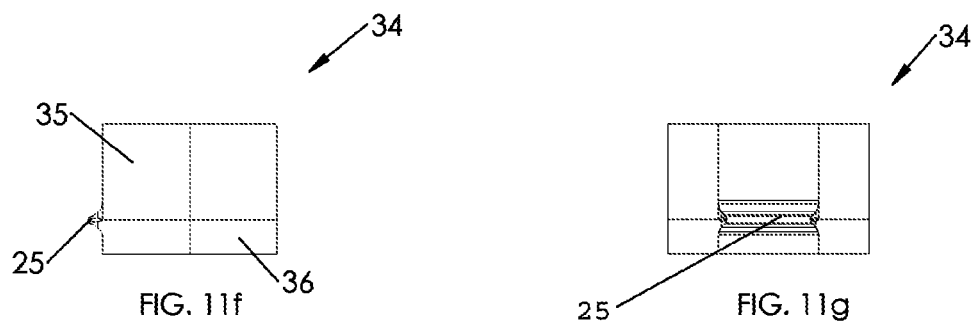
FIG. 11f
FIG. 11g
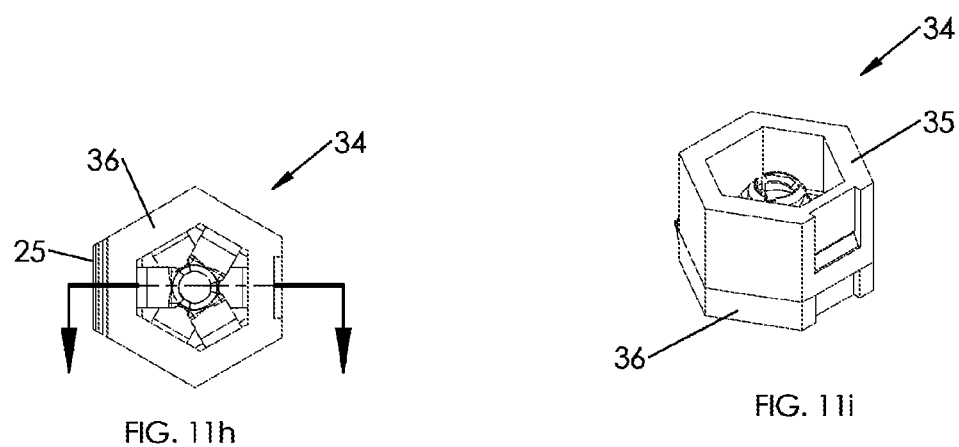
FIG. 11h
FIG. 11i
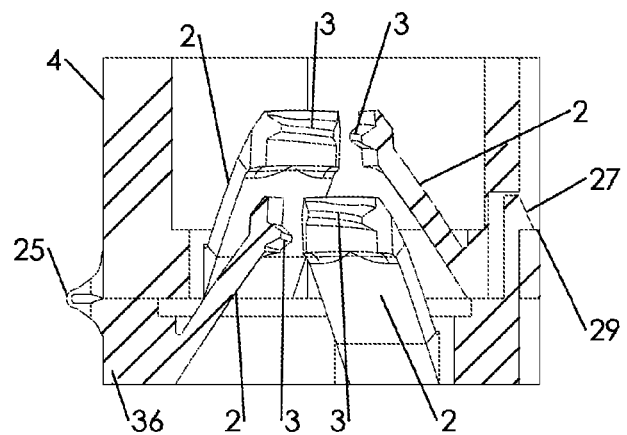
FIG. 11j

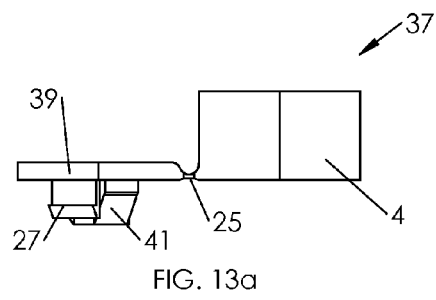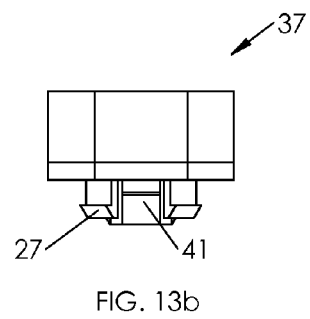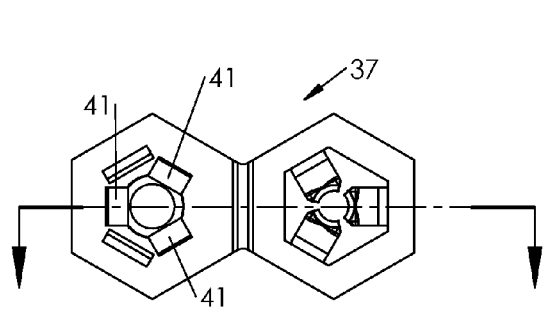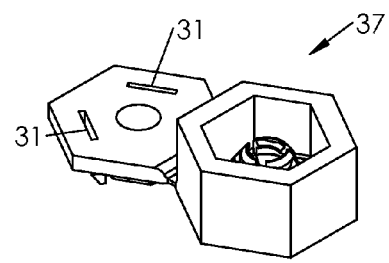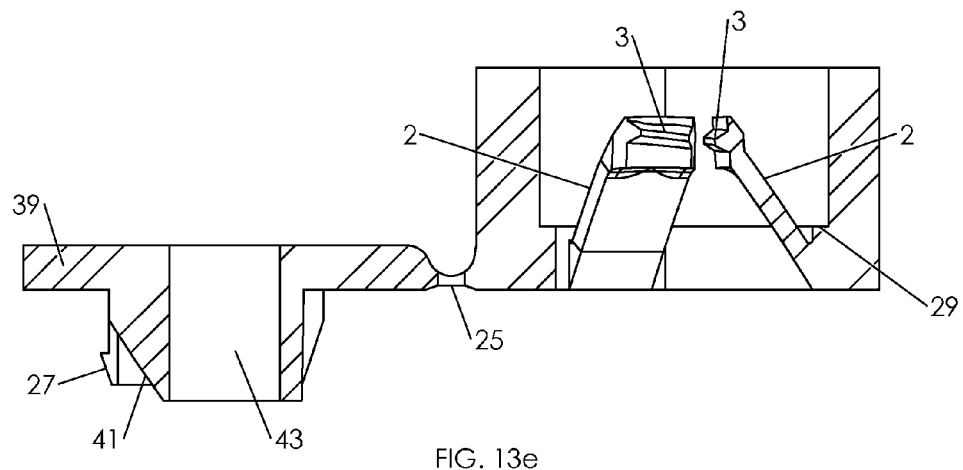

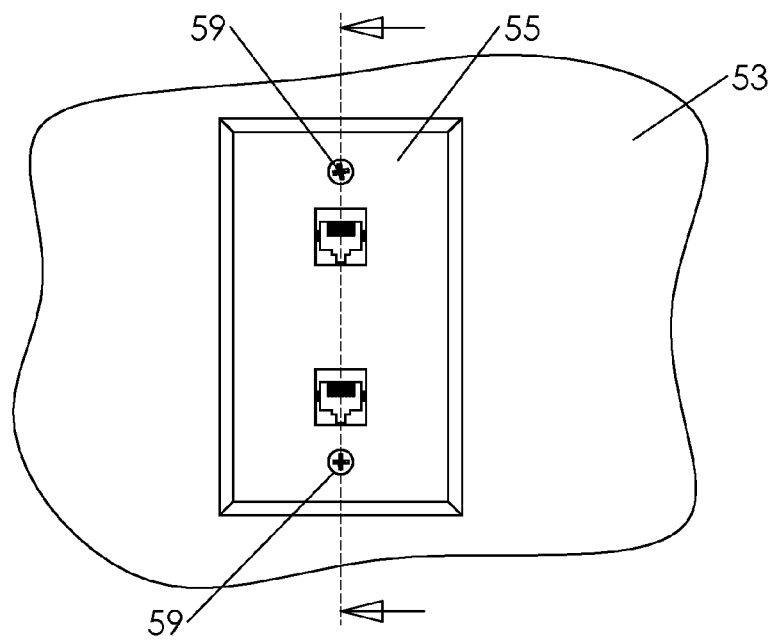
FIG. 19c
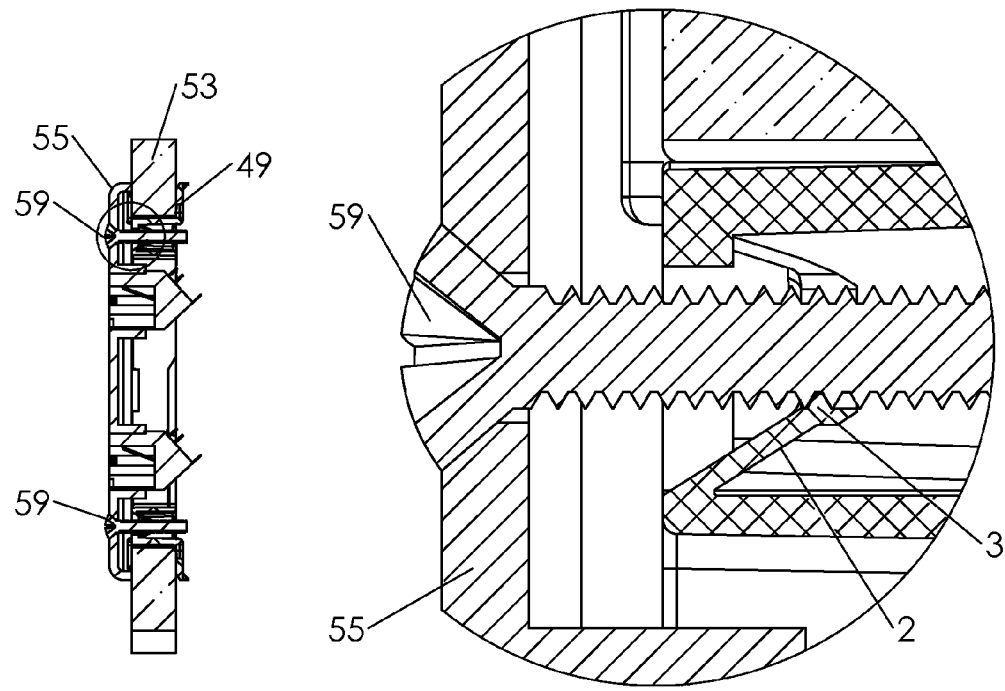
FIG. 19d
FIG. 19e

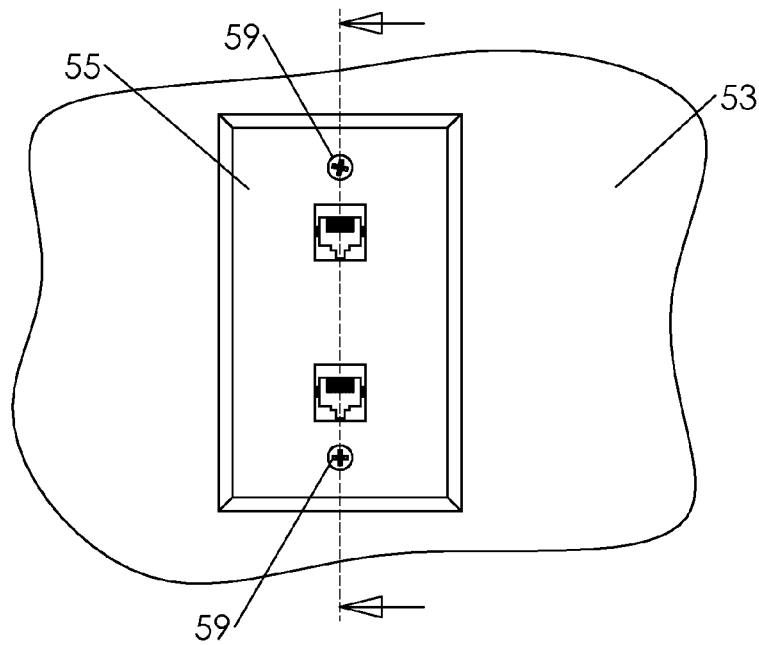
FIG. 21a
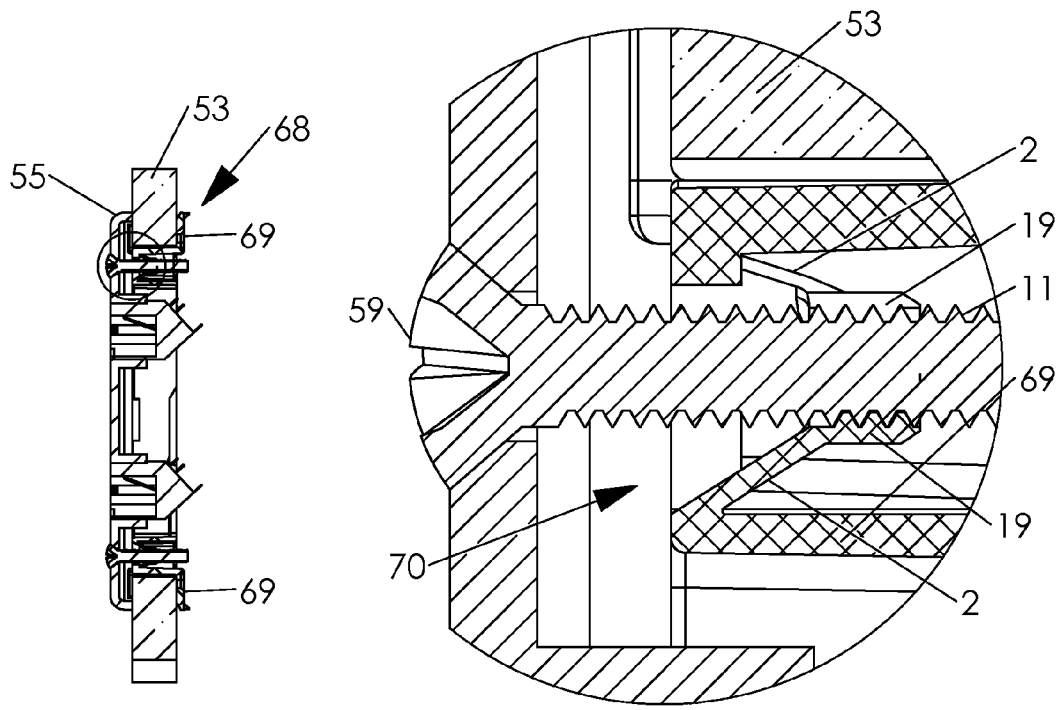
FIG. 21b
FIG. 21c

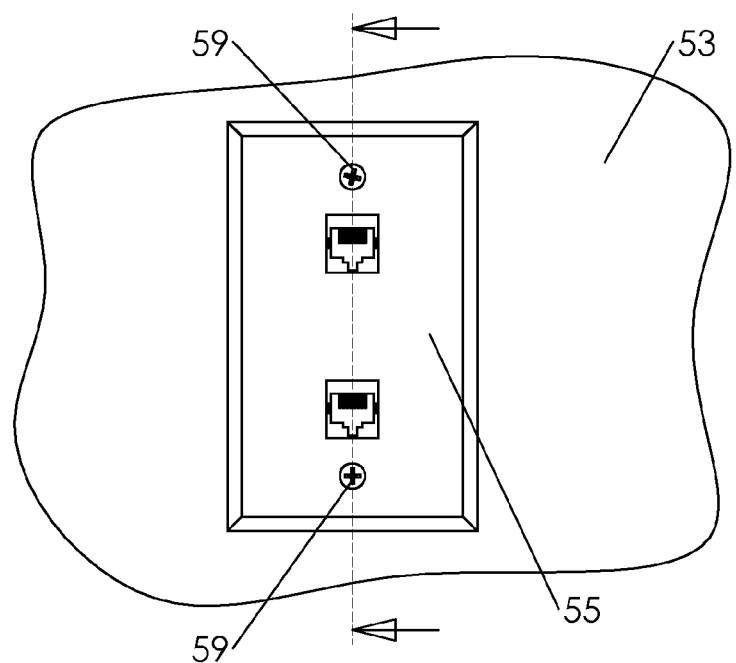
FIG. 23c
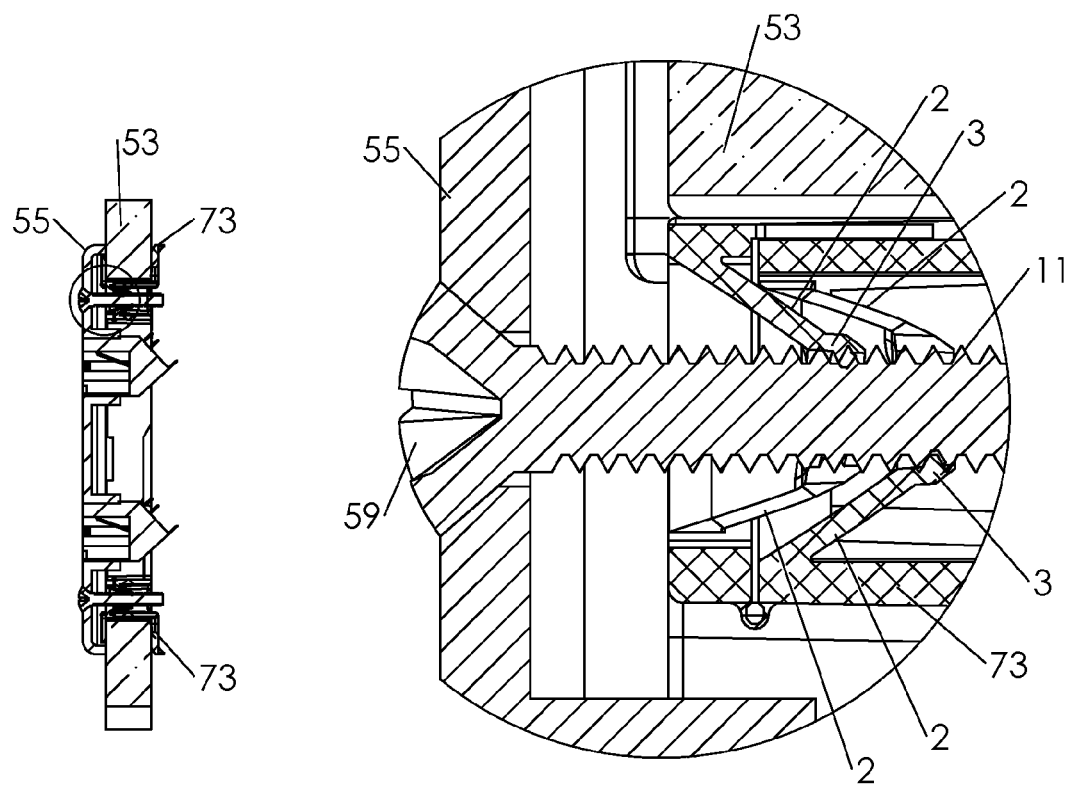
FIG. 23d
FIG. 23e

SPEED NUT AND ASSEMBLY

BACKGROUND

The benefit of provisional application 61/641,530, filed May 2, 2012 on behalf of inventors Jean-Guy Gagne and James Rogers, is claimed under 35 U.S.C. 119(e).

This disclosure is related to hardware fasteners, more particularly to what has been characterized as speed nut fasteners.

A conventional speed nut contains sheet metal or plastic prongs that act as a single thread for fixing substrates or other work pieces by attachment to an externally threaded fastener, such as a machine screw. In contrast to traditional nut fasteners, the speed nut does not require successive turning of the screw until tightening is achieved. Instead, speed nut attachment involves forced application of the speed nut to the screw that has been inserted through a hole in a substrate. The prongs are flexed without engaging with the screw threads. At the extent of travel of the speed nut, a screwdriver can be applied to turn the screw up to a full rotation to engage a screw thread and compress the substrate. The prongs then exert pressure on a single screw thread. The screw can be removed by turning in the opposite direction until the last screw thread is disengaged.

The speed nut provides the advantage of speed of installation, at the cost of weakness of structure, as compared to the traditional nut fastener. The speed nut prongs are weakened by flexure occurring substantially at their thin base connections to the fastener body. A further disadvantage is that the speed nut, when applied, can be misaligned with the screw thus increasing stresses on the device. Misalignment can also result in reducing the force necessary to maintain attachment by the single internal thread, especially compared with multiple thread attachment of a traditional nut fastener.

Needs thus exist for an improved speed nut that produces less localized stress, that distributes flexure, that can provide greater attachment strength from separate internally threaded portions, and that can prevent misalignment with the externally threaded fastener during installation.

SUMMARY OF DISCLOSURE

The needs described above are fulfilled, at least in part, by a fastener device in which segmented arms of rectangular cross section extend inwardly from a central opening in a surface of the device body. A distal end portion of each segment arm comprises an internally threaded portion. The substantially uniform rectangular cross section of the arm extension, joined to the distal end portion, distributes flexure as the arms are moved at an inward angle from the surface during application of the device to an externally threaded fastener. Increased strength may be achieved by configuring the distal end portions to comprise a plurality of internal thread portions.

The device may further comprise centering portions that are flush with the body surface. The centering portions are spaced circumferentially about the central opening and may be located between adjoining circumferentially spaced segment arms. The centering portions, flush with the body surface, project toward the center at a width that decreases inwardly from the opening to enhance alignment of the device when applied to the externally threaded screw.

Alternatively, alignment may be obtained by a second body that overlays the device body surface. Outer circumferences of the device and second body may be of coincident configuration. The second body comprises a cylindrical opening having an axis coincident with the central axis of the device. The diameter of the cylindrical opening is less than that of the central opening of the device to provide an alignment guide. The cylindrical opening of the second body may extend to the distal ends of the segments of the first body, thereby providing proper alignment as well as support for the segments when the screw is removed from the device.

The second body may be integral with the first body by provision of a hinge. The second body may be latched to the device body upon closure of the hinge by mating a barb of a flexible tab of the second body to a notch in the device body. The notch may be internal of the device outer circumference by formation of a platform extending from the wall.

In an alternative arrangement, the second body instead may have a first surface in contact with the device body surface of the first body and a second surface opposite the first surface. The second body comprises an opening circumscribing the axis. A plurality of separated flexible segments spaced circumferentially about the second surface opening and extending inwardly therefrom. Distal ends of each of the second body segments respectively include an internal threaded portion that may extend inwardly through the opening of the first body surface collectively to form a second internal thread. The plurality of segments of the second body may be circumferentially displaced, respectively, from the plurality of segments of the device body.

Alignment may be further enhanced by a third body overlying the device body at the remote opposite surface thereof, thereby providing an axially extended alignment guide. The third body may comprise substantially the same outer configuration and cylindrical opening as the second body. The second and third bodies need not extend within the device body surfaces. The third body may be hinged with the device body, and latched to the device body in a manner similar to that of the second body. Tabs near the outer periphery of the third body may mate with notches in the outer periphery of the device body.

As a further alternative, the aforementioned needs may be met by a plurality of stacked device bodies, each body comprising separated flexible segments of rectangular cross section that extend inwardly from a central opening. The segments of each body contain internal threaded portions that collectively form a single thread. Stacking of the plurality of such devices provides multiple single threads appropriately spaced to properly engage an externally threaded fastener. Each body may comprise a barbed end flexible tab as well as a notch. Two bodies may be latched to each other by mating the barbed tab of each one with the notch of the other.

Additional advantages of the present disclosure will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

Various exemplary embodiments are illustrated by way of example, and not by way of limitation, in the figures of the accompanying drawings in which like reference numerals refer to similar elements and in which:

FIGS. 1a-2e illustrate a first embodiment of a speed nut fastener;

FIGS. 1a-1d are front, side, top and perspective views, respectively, of the first embodiment;

FIG. 1e is a section view of FIG. 1c;

FIGS. 2b-2c are perspective and front views, respectively, of the assembly shown in FIG. 2a;

FIG. 2e is a detail view taken from FIG. 2d;

FIGS. 3a-4c illustrate a modification of the first embodiment;

FIGS. 3a-3d are front, side, top and perspective views, respectively, of the modified first embodiment;

FIG. 3e is a section view taken from FIG. 3c;

FIG. 4b is a section view taken from FIG. 4a;

FIG. 4c is a detail view taken from FIG. 4b;

FIGS. 5a-6c illustrate an alternative modification of the the first embodiment;

FIGS. 5a-5d are front, side, top and perspective views, respectively, of the alternative modified first embodiment;

FIG. 6b is a section view taken from FIG. 6a;

FIG. 6c is a detail view taken from FIG. 6b;

FIGS. 7a-8c illustrate a second speed nut fastener embodiment;

FIGS. 7a-7d are front, side, top and perspective views, respectively, of the second embodiment;

FIGS. 7f-7i are front, side, top and perspective views, respectively, of the speed nut in FIGS. 7a-7d in the assembled state;

FIG. 7j is a section view of FIG. 7h;

FIG. 8b is a section view taken from FIG. 8a;

FIG. 8c is a detail view taken from FIG. 8b;

FIGS. 9a-10c illustrate a third speed nut fastener embodiment;

FIGS. 9a-9d are front, side, top and perspective views, respectively, of the third embodiment in a molded state;

FIG. 10b is a section view of FIG. 10a;

FIG. 10c is a detail view taken from FIG. 10b;

FIGS. 11a-12c illustrate a fourth speed nut fastener embodiment;

FIGS. 11a-11d are front, side, top and perspective views, respectively, of fourth embodiment in molded state;

FIG. 11e is a section view of FIG. 11c;

FIGS. 11f-11i are front, side, top and perspective views, respectively, of the fourth embodiment in the assembled state;

FIG. 11j is a section view of FIG. 11h;

FIG. 12b is a section view taken from FIG. 12a;

FIG. 12c is a detail view taken from FIG. 12b;

FIGS. 13a-14c illustrate a fifth speed nut fastener embodiment;

FIGS. 13a-13d are front, side, top and perspective views, respectively, of the fifth embodiment;

FIG. 13e is a section view taken from FIG. 13c;

FIG. 14b is a section view taken from FIG. 14a;

FIG. 14c is a detail view taken from FIG. 14b;

FIGS. 15-17c illustrate a sixth speed nut fastener embodiment;

FIG. 17b is a section view taken from FIG. 17a;

FIG. 17c is a detail view taken from FIG. 17b;

FIGS. 19a-19c are exploded perspective, perspective and front views of the bracket of FIGS. 18a-18c installed with a low voltage device cover plate;

FIG. 19d is a section view taken from FIG. 19c;

FIG. 19e is a detail view taken from FIG. 19d;

FIG. 21a is a front view of an alternate embodiment of the rework low voltage bracket installed with a low voltage device cover plate;

FIG. 21b is a section view taken from FIG. 21a;

FIG. 21c is a detail view taken from FIG. 21b;

FIGS. 23a-23c are exploded perspective, perspective and front views of the bracket from FIGS. 22e-22g installed with a low voltage device cover plate;

FIG. 23d is a section view of FIG. 23c;

FIG. 23e is a detail view taken from FIG. 23d;

FIG. 24b is a section view taken from FIG. 24a;

FIG. 24c is a bottom view of the electrical box shown in FIG. 24a;

FIG. 24e is a perspective view of the electrical box shown in FIG. 24a; and

DETAILED DISCLOSURE

Figure 2A:
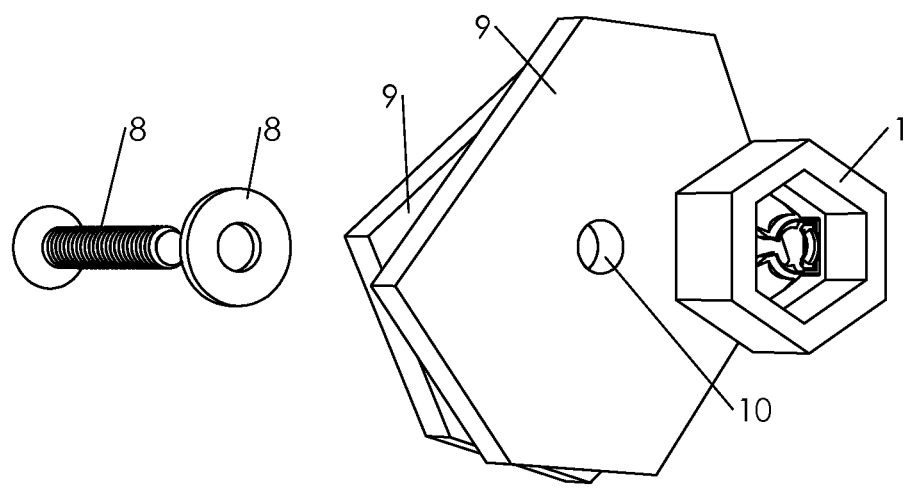
FIG. 2a is an exploded perspective view of the first embodiment shown in assembly.
Figure 2B:
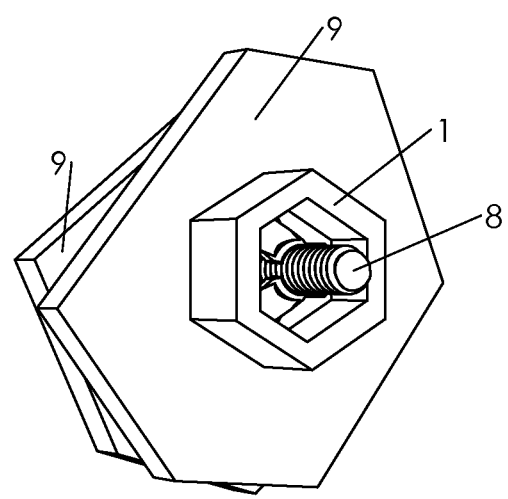
Figure 2C:
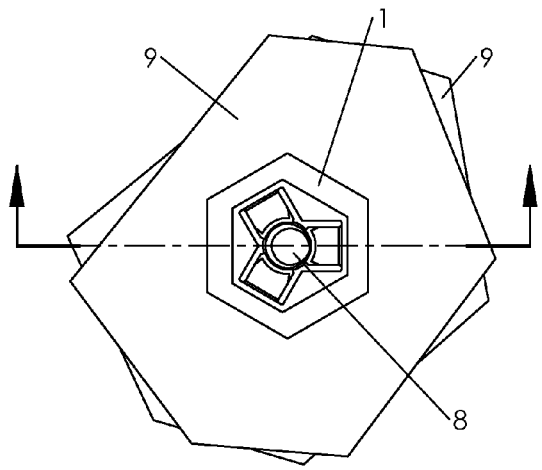
Figure 2D:
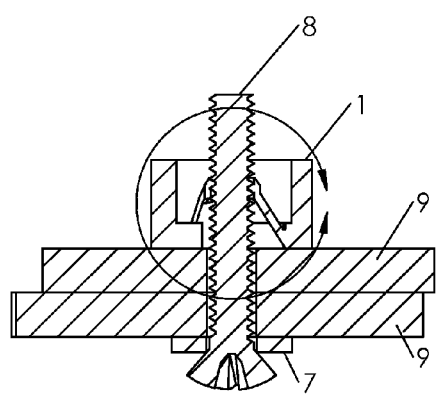
FIG. 2d is a section view of FIG. 2c.
Figure 2E:
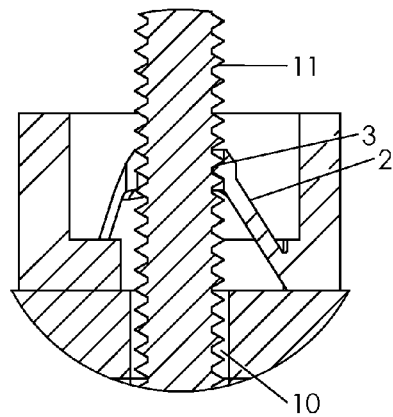
Figure 4A:
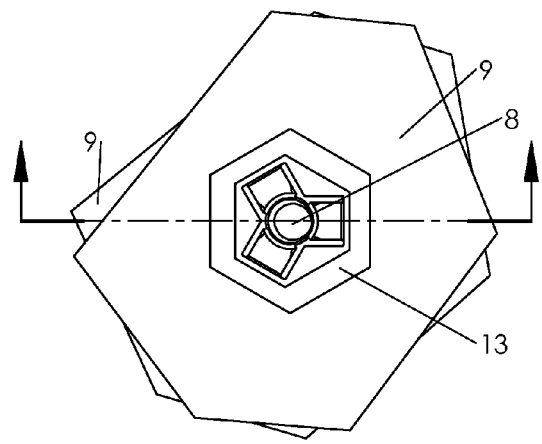
FIG. 4a is a front view of the modified first embodiment shown in assembly.
Figure 4B:
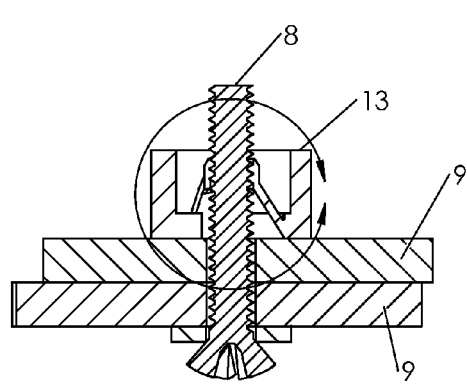
Figure 4C:
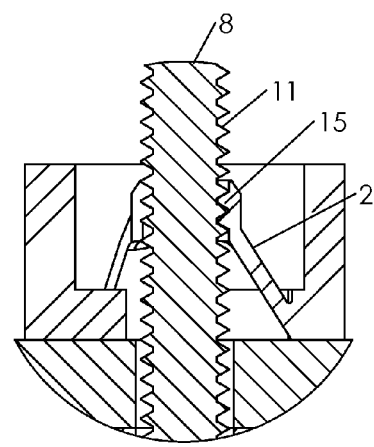
Figure 5A:
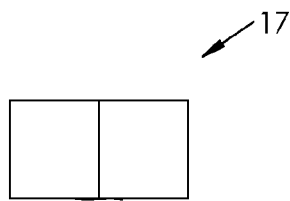
Figure 5B:
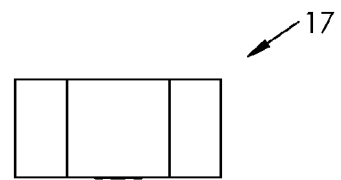
Figure 5C:
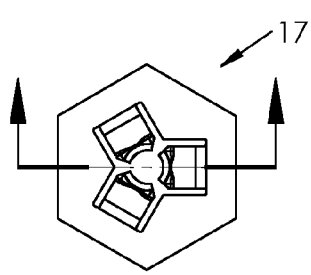
Figure 5D:
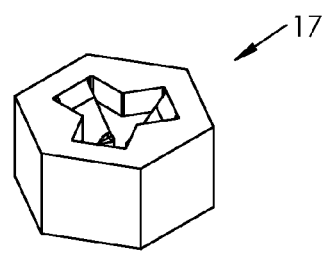
Figure 5E:
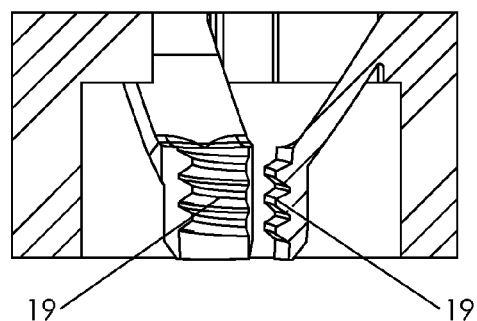
FIG. 5e is a section view taken from FIG. 5c.
Figure 6A:
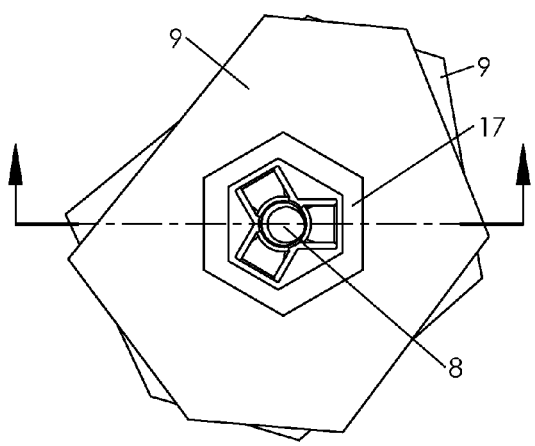
FIG. 6a is a front view of the alternative modified embodiment of FIGS. 5a-5e shown in assembly.
Figure 6B:
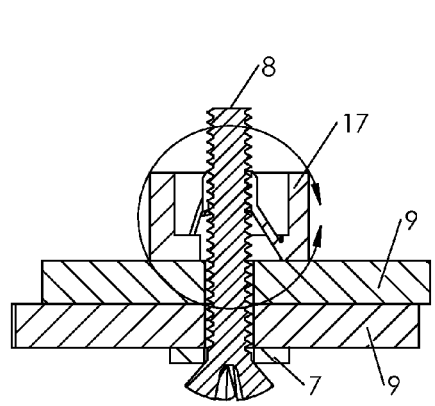
Figure 6C:
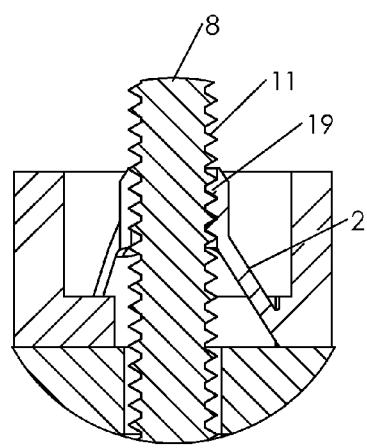

FIGS. 1a-1e are multiple views of a preferred embodiment of a speed nut fastener 1, shown in front view in FIG. 1a, in side view in FIG. 1b and in perspective in FIG. 1d. The section view of FIG. 1e is taken from the top view of FIG. 1c. Body 5 contains an internal aperture forming a central opening. Segmented flexible arms 2 extend at an inward angle from the body surface. A distal end portion of each segment arm comprises a partial internally threaded portion 3. The substantially uniform rectangular cross section of the arm extension 2, joined to the distal end portion, distributes flexure as the arms are moved at an inward angle from the surface during application of the device to an externally threaded fastener.

Speed nut fastener 1 can be produced, for example, with a two part injection mold without need of special action such as rotating or collapsible cores. Due to the flexibility of arms 2, the device is molded to configure partial threads 3 closer to each other than they will be after insertion of an externally thread bolt or machine screw. Partial threads 3, therefore, will be ensured positive engagement with the bolt threads to collectively form a single thread. Although three arms 2 are illustrated herein, the concepts of this disclosure are applicable to a device having two, four or more arms.

Speed nut fastener 1 can be used to secure a multiple substrate workpiece, as shown in FIGS. 2a-2e. Two sheets of material 9 are held together by machine screw 8 and speed nut fastener 1 via holes 10 and washer 7. The thread diameter and pitch of screw 8 are sized to match partial thread 3 of speed nut fastener 1. During assembly, screw 8 is fed through washer 7 and holes 10 in material 9. Speed nut fastener 1 is pushed without rotation onto screw 8, forcing partial threads 3 away by virtue of flexure of arms 2. Partial threads 3 drop into threads 11 of bolt 8 until sheet material 9 prevents further movement. A driver and hex wrench, or the like, are used on screw 8 the hex walls 4 of fastener 1, respectively, for rotation relative to each other to preload the assembly and compress materials 9. This assembly is faster and easier than assembly using a conventional nut fastener. Speed nut fastener 1 can be removed from the assembly by reverse rotation of screw 8, by a screw driver or the like until threads 11 are clear of threads 3.

Body 5 comprises centering portions 6 that are flush with the body surface. Centering portions 6 are spaced circumferentially about the central opening and may be located between adjoining circumferentially spaced segment arms 2. Centering portions 6 project toward the center at a width that decreases inwardly from the opening to enhance alignment of the device when applied to the externally threaded screw 8.

The distal end portions of segmented arms 2 may be formed each with two successive internal machine threads, illustrated as speed nut fastener 13 in FIGS. 3a-3e and FIGS. 4a-4c. The formation of two successive internal machine threads segmented into three partial double threads 15 provides increased pull-out resistance and decreases the likelihood of stripping. Such an element can be fabricated with a rotating or collapsible core to injection mold the part.

Speed nut 17, shown in FIGS. 5a-5e and FIGS. 6a-6c are configured with three successive internal machine threads segmented into three partial triple threads 19, thereby further decreasing the likelihood of stripping while increasing pull-out strength.

FIGS. 7a-8c illustrate a second embodiment of speed nut fastener 21. A second body, comprising second body alignment ring 23 is integral to the first body by means of living hinge 25. The device may be fabricated by a two part injection mold. Closure of hinge 25 permits the second body to overlay the device body surface, outer circumferences thereof being of coincident configuration. As shown, second body alignment ring 23 forms a cylindrical opening having an axis coincident with the central axis of the device. The diameter of the cylindrical opening is less than that of the central opening of the device to provide an alignment guide. The cylindrical opening of the second body may extend to the distal ends of the segments of the first body, thereby providing proper alignment as well as support for the segments when the screw is removed from the device.

Figure 7A:
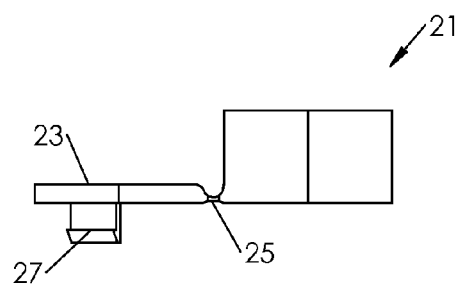
Figure 7B:
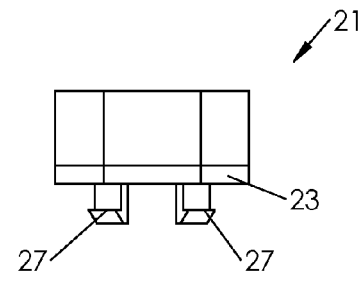
Figure 7C:
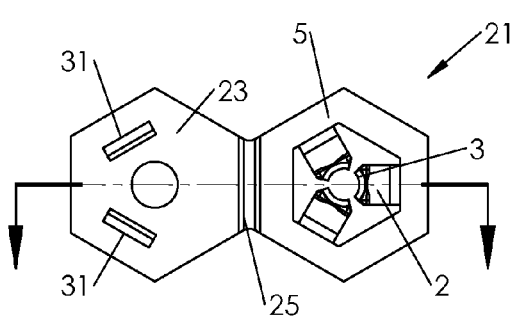
Figure 7D:
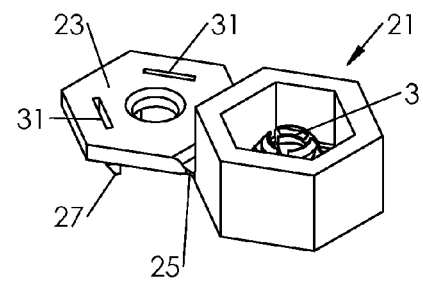
Figure 7E:
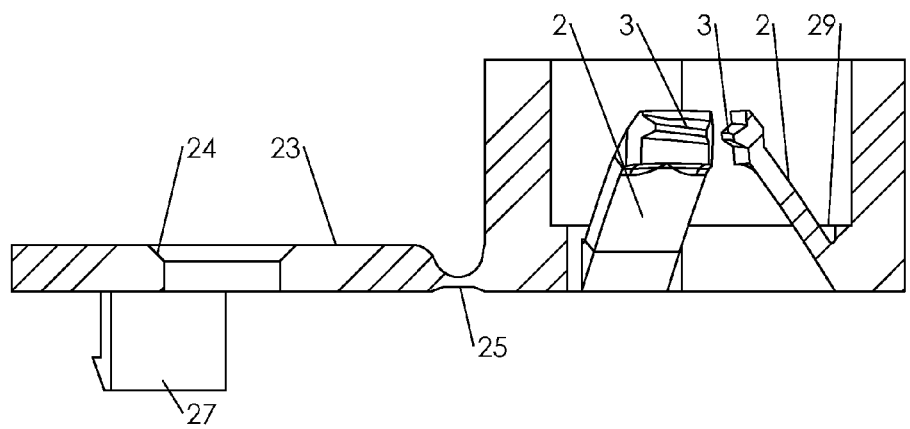
FIG. 7e is a section view taken from FIG. 7c.
Figure 8A:
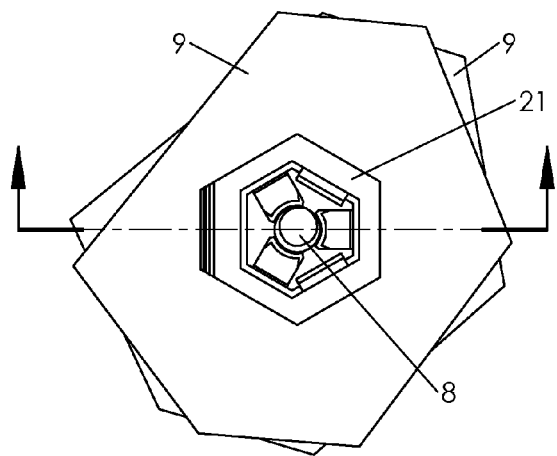
FIG. 8a is a front view of the second embodiment assembly.
Figure 8B:
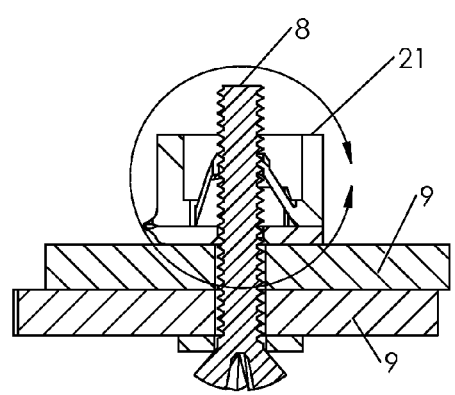
Figure 8C:
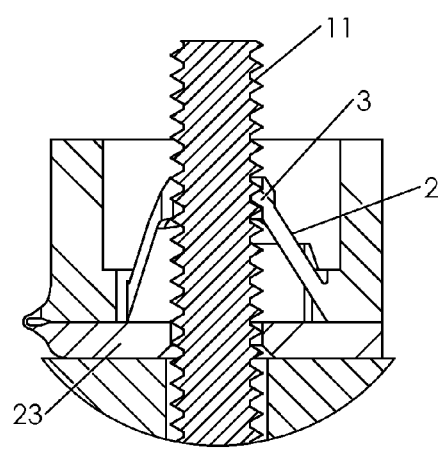
Figure 9A:
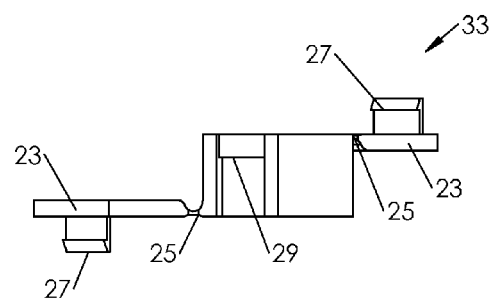
Figure 9B:
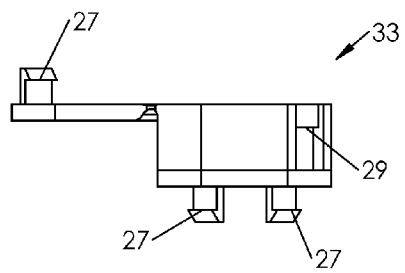
Figure 9C:
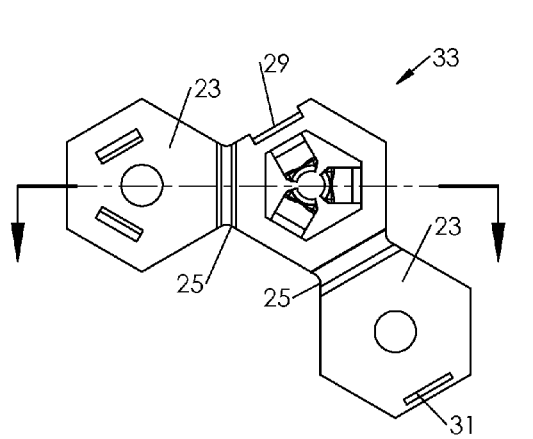
Figure 9D:
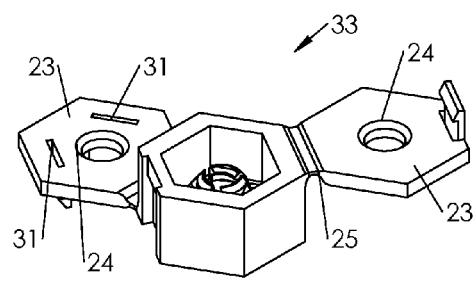
Figure 9E:
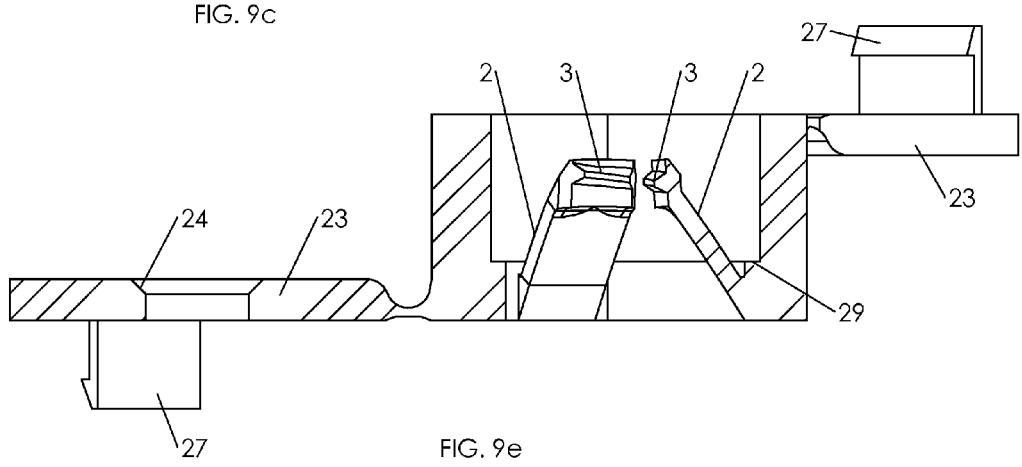
FIG. 9e is a section view of FIG. 9c.
Figures 9F, 9G:
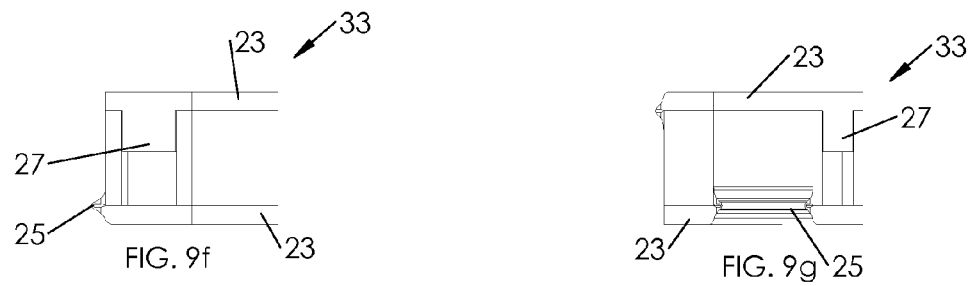
FIGS. 9f-9i are front, side, top and perspective views, respectively, of the third embodiment in assembled state.
Figures 9H, 9I:
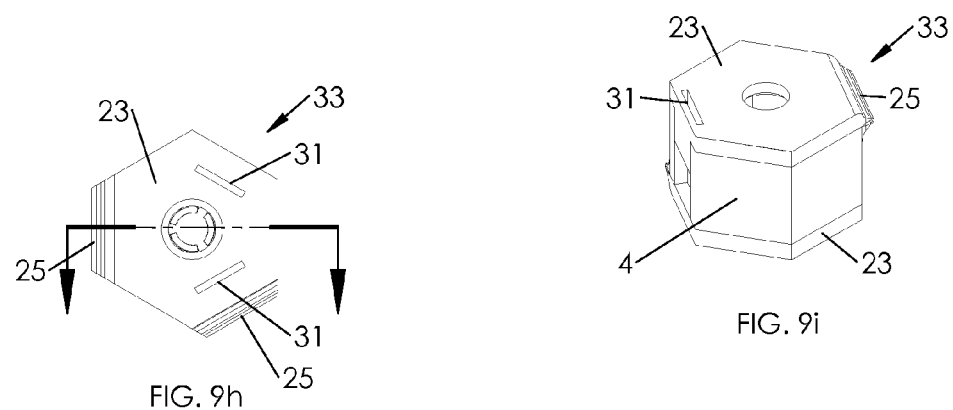
Figure 9J:
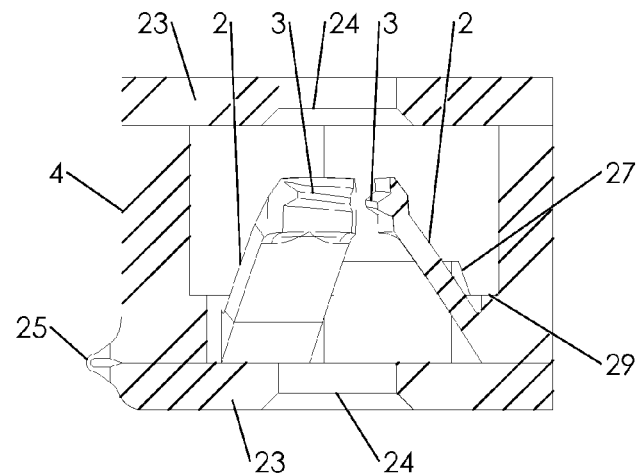
FIG. 9j is a section view taken from FIG. 9h.
Figure 10A:
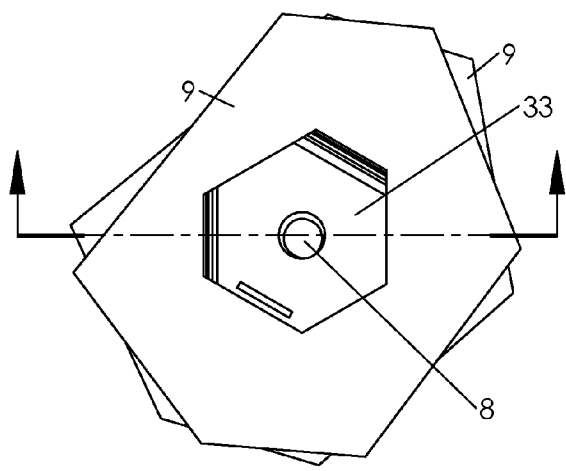
FIG. 10a is a front view of an assembly of the third embodiment.
Figure 10B:
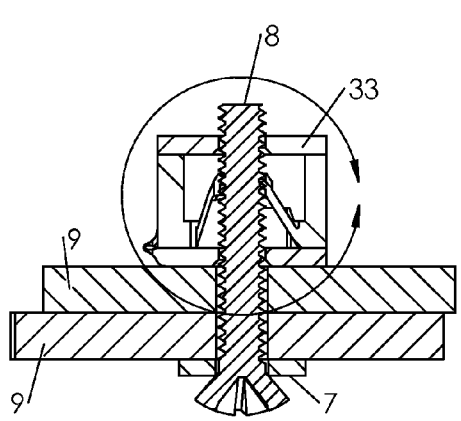
Figure 10C:
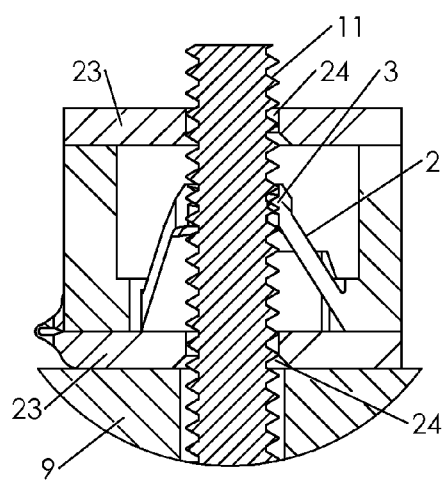

As shown in FIGS. 7a and 7b, cantilevered snap beams 27 comprise flexible tabs with barbed ends. Slots 31 allow the barbs to be molded without special mold actions such as lifters. The second body may be latched to the device body upon closure of the hinge by mating the barb 27 to notch 29 in the device body, shown in FIG. 7e. Notch 29 comprises a platform extending internally from the device wall. As shown in FIG. 8c, second body alignment ring 23 retains screw 8 concentric with the center of speed nut 21, thereby reducing the likelihood of asymmetric loading on partial threads 3 and arms 2.

Alignment may be further enhanced by a third body overlying the device body at the remote opposite surface thereof, thereby providing an axially extended alignment guide. Such arrangement is illustrated in FIGS. 9a-10c. The third body comprises substantially the same outer configuration and cylindrical opening 24 as the second body. The third body may be hinged with the device body by hinge 25, and latched to the device body in a manner similar to that of the second body. Tab 27, shown in FIG. 9d, near the outer periphery of the third body may mate with notch 29, shown in FIG. 9c, in the outer periphery of the device body.

Figure 12A:
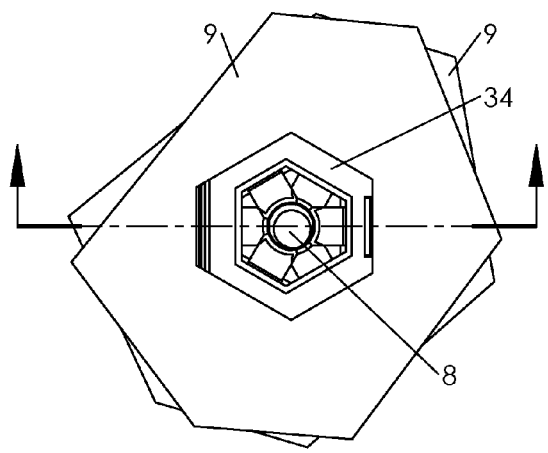
FIG. 12a is a front view of an assembly of the fourth embodiment.
Figure 12B:
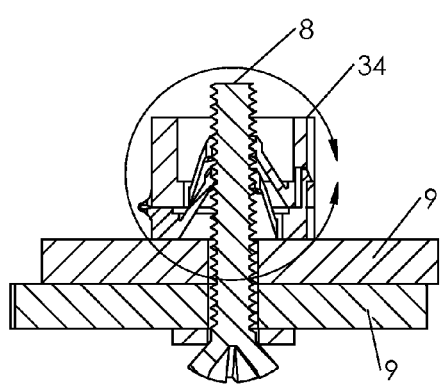
Figure 12C:
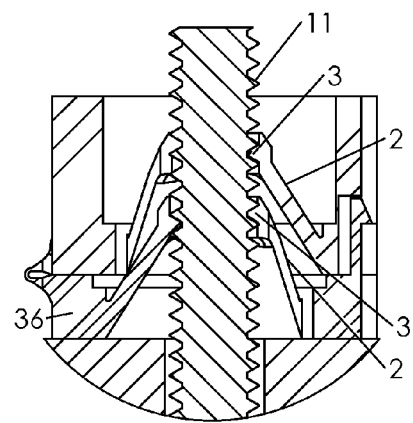
Figure 13F:
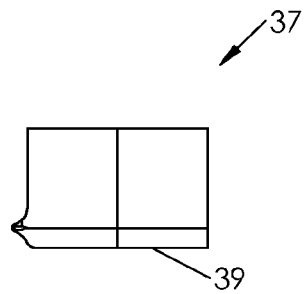
FIGS. 13f-13i are front, side, top and perspective views, respectively, of the fifth embodiment in the assembled state.
Figure 13G:
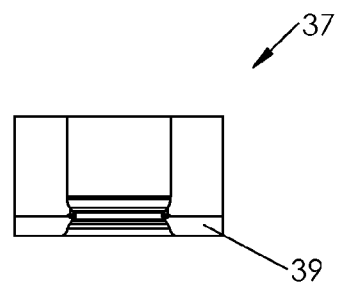
Figure 13H:
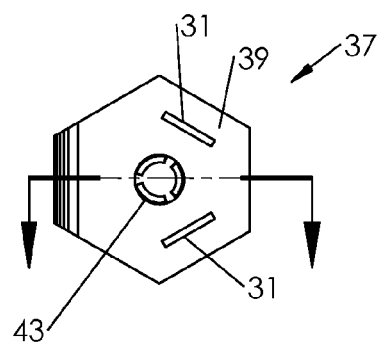
Figure 13I:
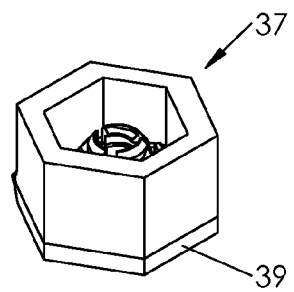
Figure 13J:
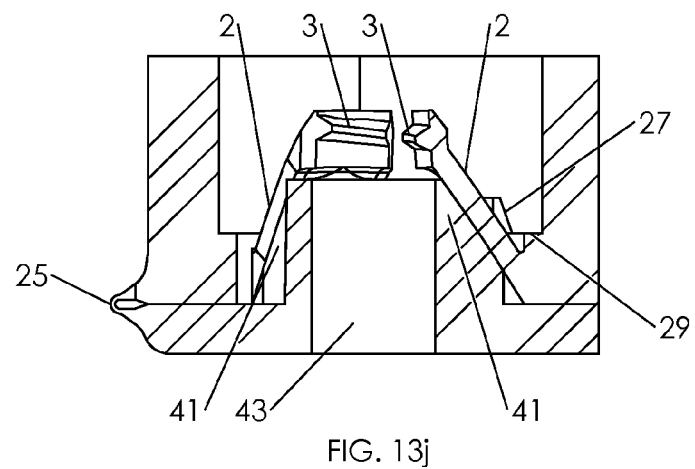
FIG. 13j is a section view of FIG. 13h.

A further embodiment is illustrated as speed nut fastener 34 in FIGS. 11a-12c. A main body 35 is configured with elements corresponding to this illustrated in FIGS. 1a-1e. Secondary body 36 is joined to body 35 by hinge 25. Body 35 and 36 each comprise arms 2 that terminate in partial threads 3, as can be seen in FIG. 11e. Closure of the hinge joins barbs 27 of the body 36 with notch 29 of body 35, latching them together as illustrated in FIG. 11j. Two sets of single threads, appropriately spaced to conform with the external threads of screw 8, are illustrated in FIG. 12c. As can be seen, arms 2 of body 36 extend within body 35. This device provides increased pull-out strength and strip torque. Arms 2 of body 36 are offset 60 degrees in relation to arms 2 of body 35 to increase radial force on screw 8 and maintain concentricity of screw 8 in speed nut fastener 34.

Figure 14A:
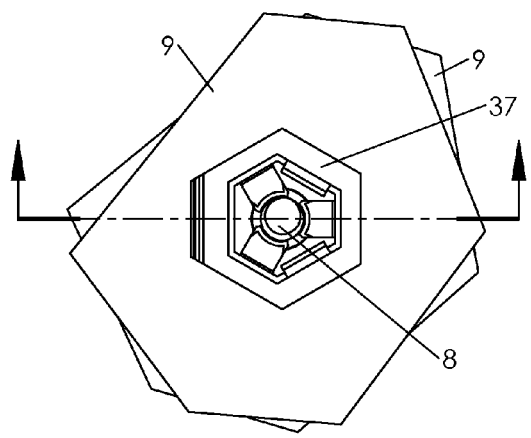
FIG. 14a is a front view of an assembly of the fifth embodiment.
Figure 14B:
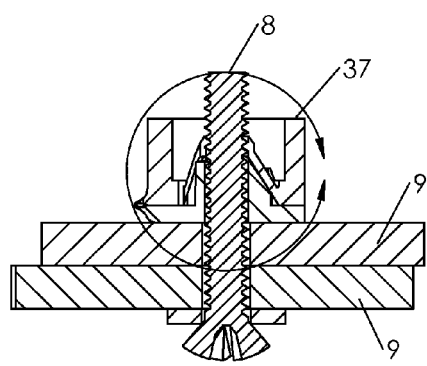
Figure 14C:
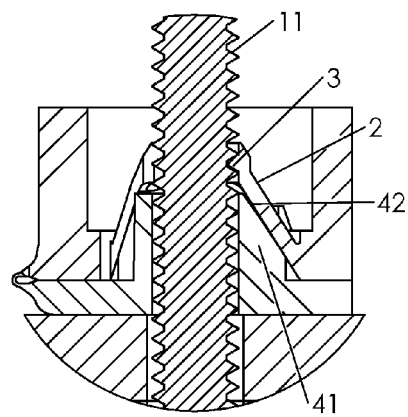
Figure 15A:
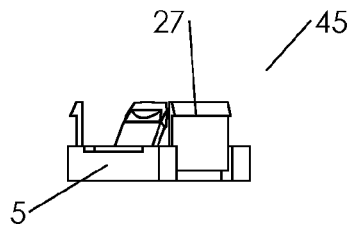
FIGS. 15a-15d are front, side, top and perspective views, respectively, of the sixth embodiment.
Figure 15B:
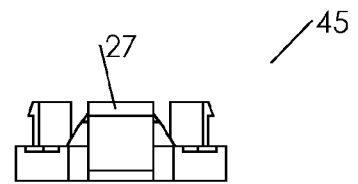
Figure 15C:
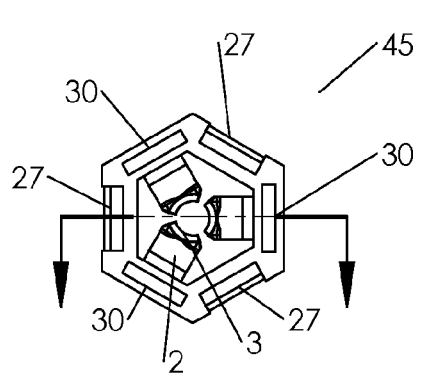
Figure 15D:
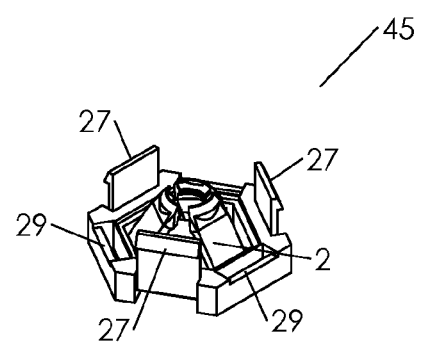
Figure 15E:
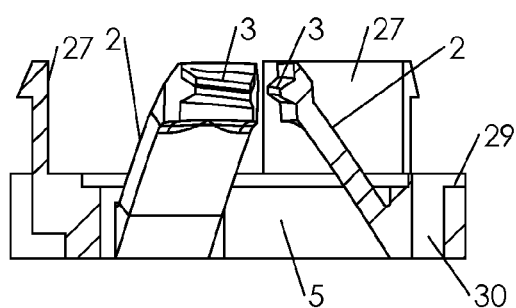
FIG. 15e is a section view taken from FIG. 15c.
Figure 16A:
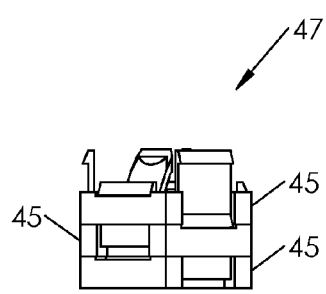
FIGS. 16a-16d are front, side (exploded), top and perspective views, respectively, of stacked assembled elements of the sixth embodiment.
Figure 16B:
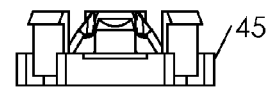
Figure 16B:
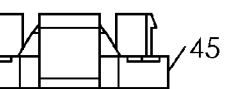
Figure 16C:
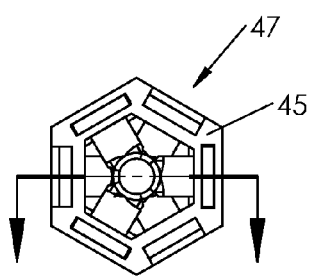
Figure 16D:
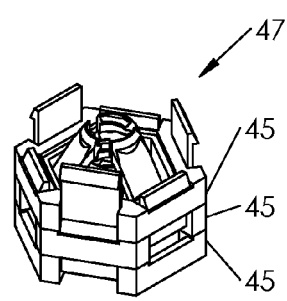
Figure 16E:
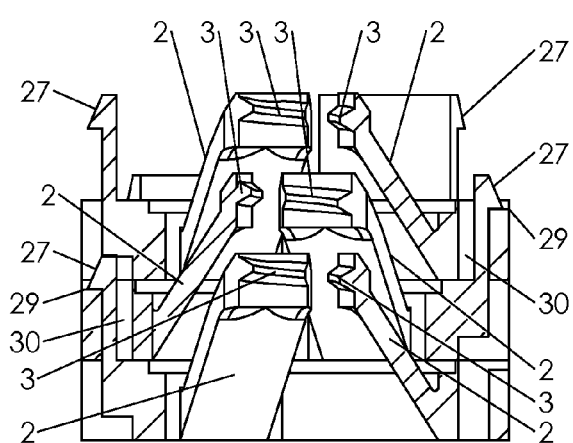
FIG. 16e is a section view taken from FIG. 16c.
Figure 16F:
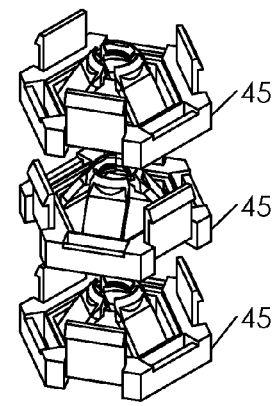
FIG. 16f is a perspective exploded view of the assembly shown in FIGS. 16a-16d.

A variation of the second embodiment of FIGS. 7a-8c is illustrated in FIGS. 13a-14c. The cylindrical opening support structure 41 of the second body 39 extends to the distal ends of arms 2 of the body 37, thereby providing proper alignment as well as support for the segments when the screw is removed from the device. As can be seen in FIG. 13j, alignment ring 43 with integral support structure 41 is held in place by cantilevered beams 27 on notch surface 29 to maintain flexure of arms 2. Structure 41, by supporting arms 2, preventing inward buckling thereof. As illustrated by FIGS. 14a-14c, partial threads 3 are engaged with threads 11 of screw 8. Arms 2 are flexed outwardly to a small degree, causing a slight convexity to the inward surface 42. Support structure 41 prevents failure due to inward buckling. Similar to speed nut 21 in FIGS. 9a-9j, hole 43 in alignment ring 39 serves to maintain concentricity of the bolt reducing the likelihood of asymmetric loading on the partial threads 3 and arms 2.

FIGS. 15a-17c illustrate a speed nut fastener assembly in which a plurality of fasteners are each configured to mate with an adjoining fastener in a stacking relationship. Each fastener body comprises separated flexible segments 2 of rectangular cross section that extend inwardly from a central opening, such as illustrated in FIGS. 1a-1e. The segments 3 of each body contain internal threaded portions that collectively form a single thread. Stacking of the plurality of such devices provides multiple single threads appropriately spaced to properly engage an externally threaded fastener. Each body may comprise a barbed end flexible tab 27 as well as a notch 29. Two bodies may be latched to each other by mating the barbed tab 27 of each one with the notch 29 of the other.

Figure 17A:
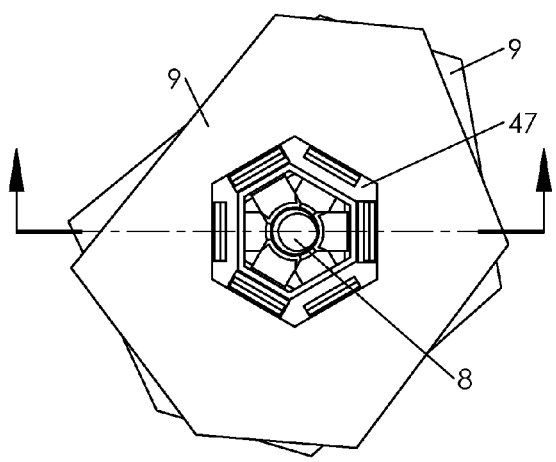
FIG. 17a is a front view of the stacked assembly of the sixth embodiment.
Figure 17B:
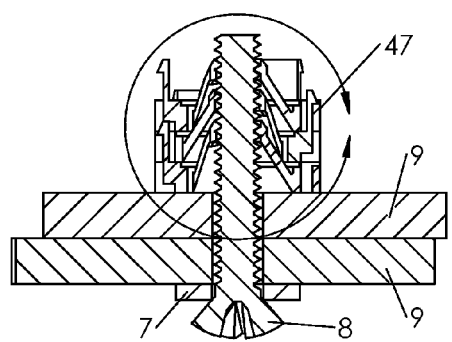
Figure 17C:
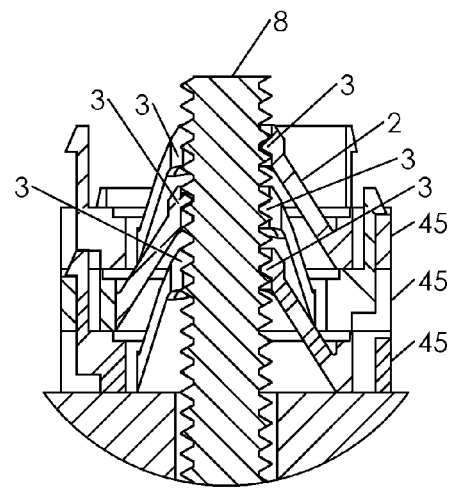
Figure 18A:
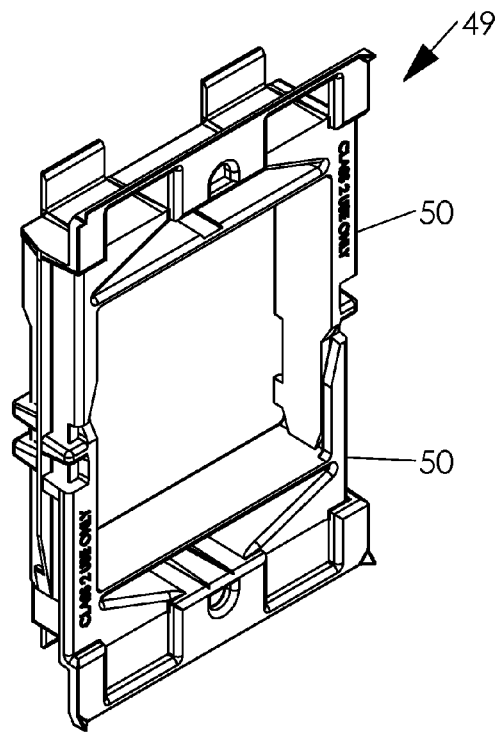
FIGS. 18a-18c are front and back perspective and front views, respectively, of a rework low voltage bracket comprising speed nut ratchet threads.
Figure 18B:
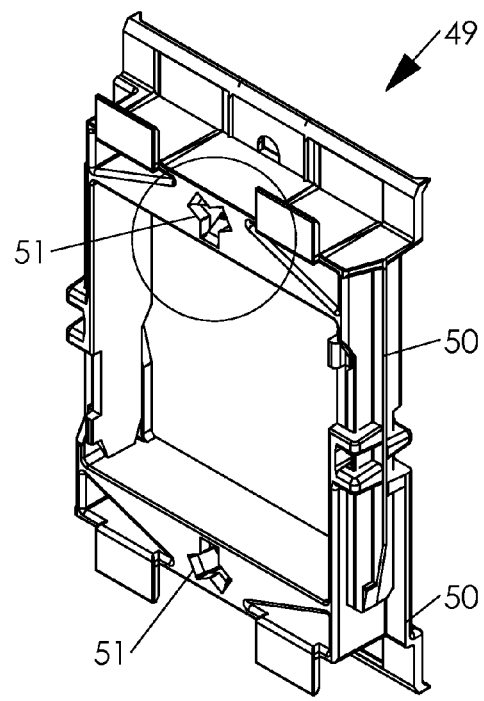
Figure 18C:
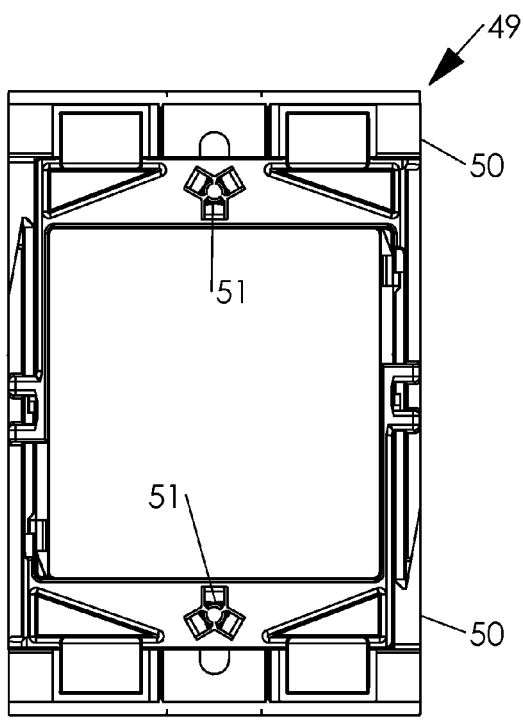
Figure 18D:
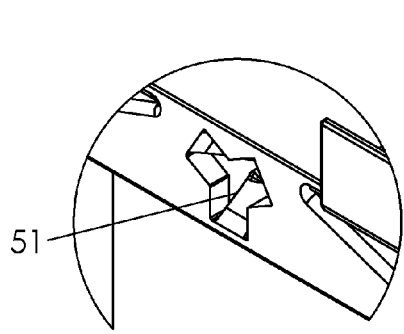
FIG. 18d is a detail view taken from FIG. 18b.
Figure 19A:
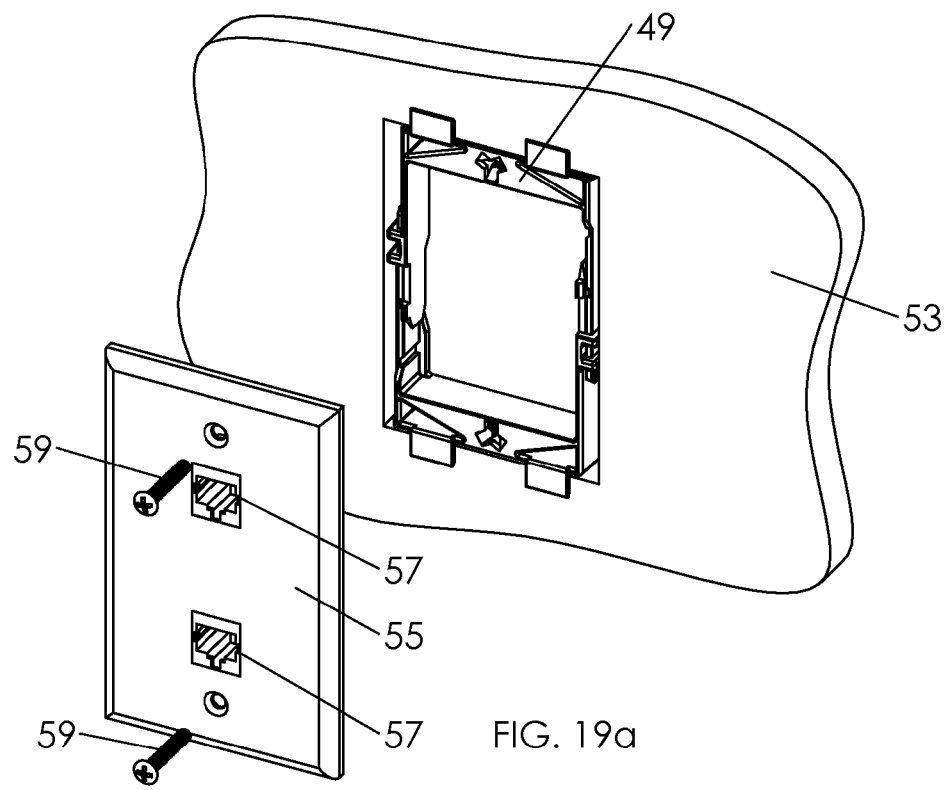
Figure 19B:
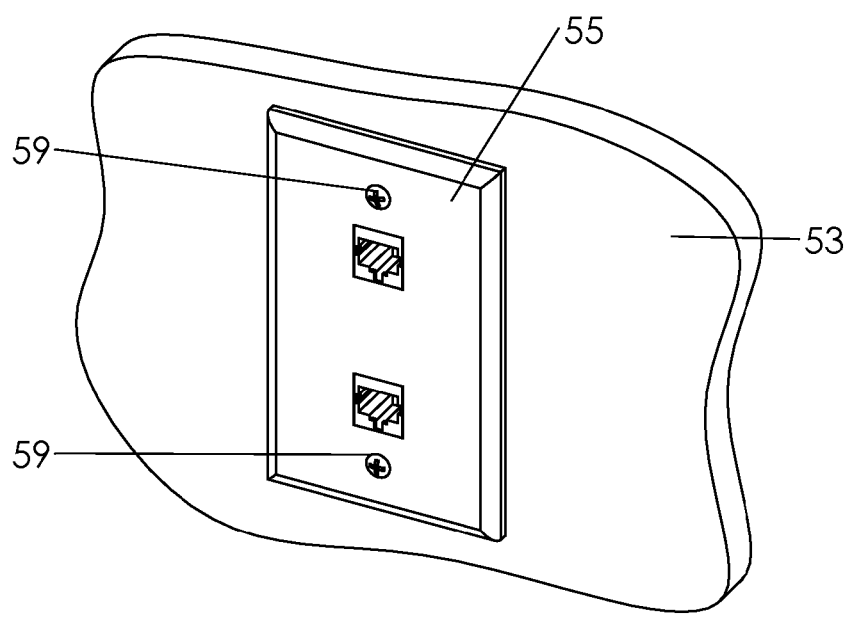

A fastener body is illustrated in isolation in FIGS. 15a-15e. FIGS. 16a-16f depict the stacking relationship of a plurality of fastener bodies. FIGS. 17a-17c illustrate the stacked fasteners assembled with a mated screw. Assembly 47 provides increased strength as compared to individual speed nut fasteners. Fastener 45 comprises three cantilevered snap beams 27 that pass through snap slots 30 and engage catch surfaces 29. The widths of cantilevered snap beam 27 and slot 30 can be made different those of the other fasteners of the stack to ensure to ensure that beams 27 will only fit into slots 30 in one way. This dimensioning ensures that sequentially assembled fasteners 45 of a stack are oriented such that all partial threads 3 are at the correct pitch and orientation. Arms 2 of each successive speed fastener 45 are offset by 60 degrees in relation to the adjoining fastener to strengthen the radial force on screw 8.

Rework low voltage bracket 49, shown in FIGS. 18a-18d, serves to mount low voltage electrical device with integral cover plate 55 in drywall 53 as shown in FIGS. 19a-19e. This arrangement is disclosed in application Ser. No. 13/656,157, filed by the present inventors on Oct. 22, 2012, and entitled "Low Voltage Frame Assembly. Each half frame 50 of bracket 49 has ratchet thread 51 integral to it. Ratchet thread 51, similar to speed nut fastener 1 shown in FIGS. 1a-1e, has resilient arms 2 with partial thread 3 at the end of each. Each half frame 50 of the mounting apparatus is identical to the other and is injection moulded from a two part tool without retractable cores. The original disclosure of the integral ratchet thread in the low voltage electrical device mounting apparatus shows conical arms rather than the linear arms (with constant rectangular section shown here). Both conical and linear maybe employed. Linear arm provide less resistance to screw insertion than conical arms reducing the likelihood of thread damage during screw insertion however they provide less resistance to bucking. Bracket 49 is self supported in a hole in drywall 53. Low voltage electrical device with integral cover plate 55, with telephone jacks 57, is mounted to bracket 49 with threaded fastener 59 into ratchet threads 51. External threads of fastener 59 engage partial thread 3. Ratchet thread 51 replaces a traditionally threaded hole allowing fastener 59 to be pushed in past most of the threads and a driver used to rotate the screw to only tighten the assembly.

Figure 20A:
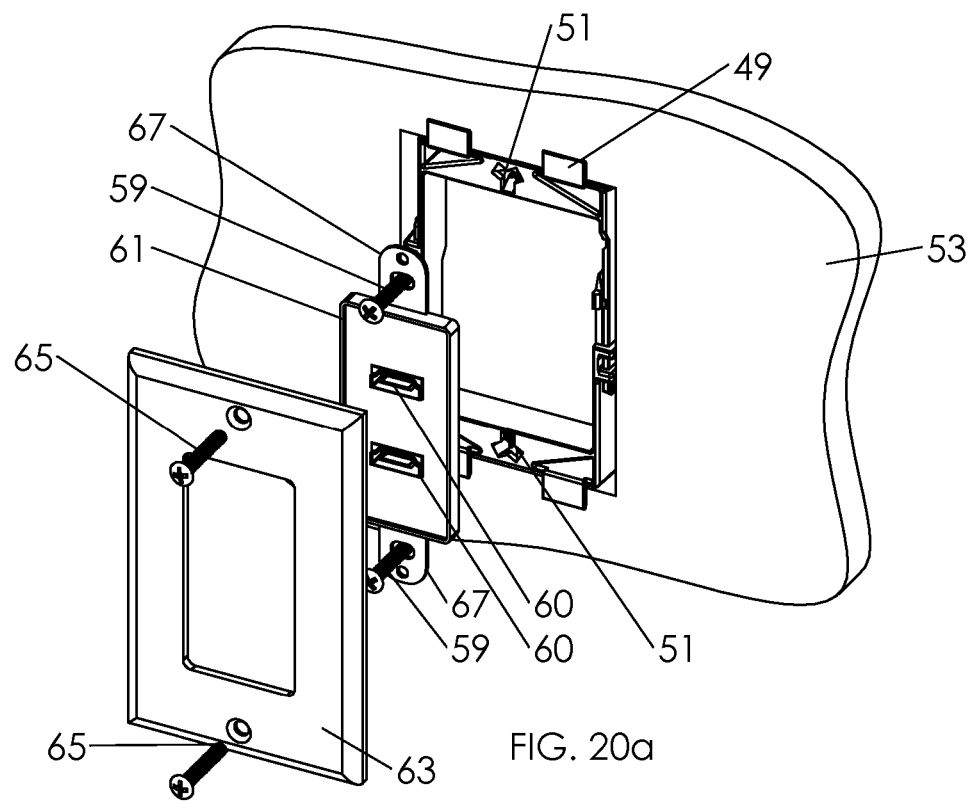
FIGS. 20a-20b are exploded perspective and perspective views of the bracket of FIGS. 18a-18c installed with a low voltage device and separate cover plate.
Figure 20B:
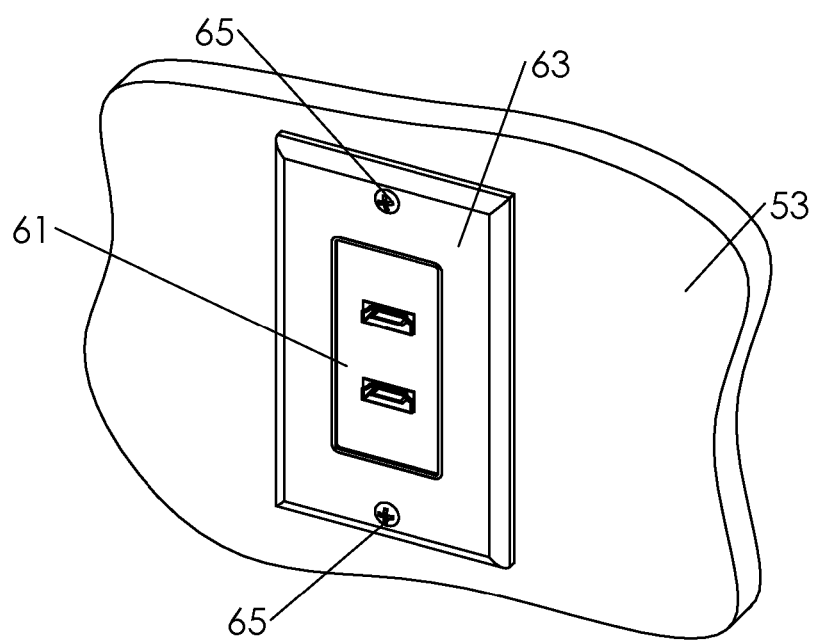
Figure 22A:
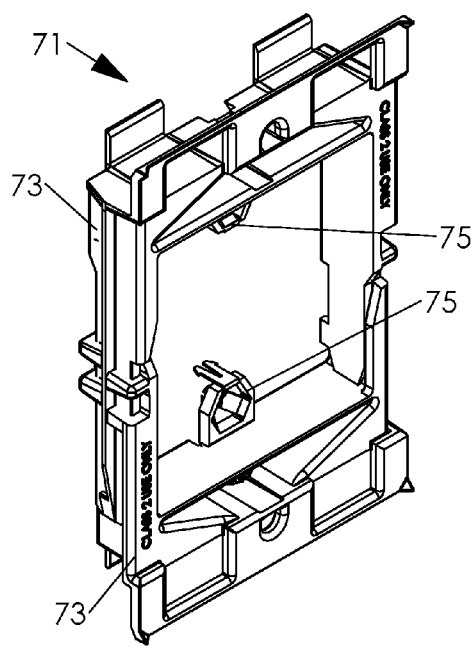
FIGS. 22a-22c are front and back perspective and front views, respectively, of an alternate embodiment of the rework low voltage bracket comprising speed nut ratchet threads.
Figure 22B:
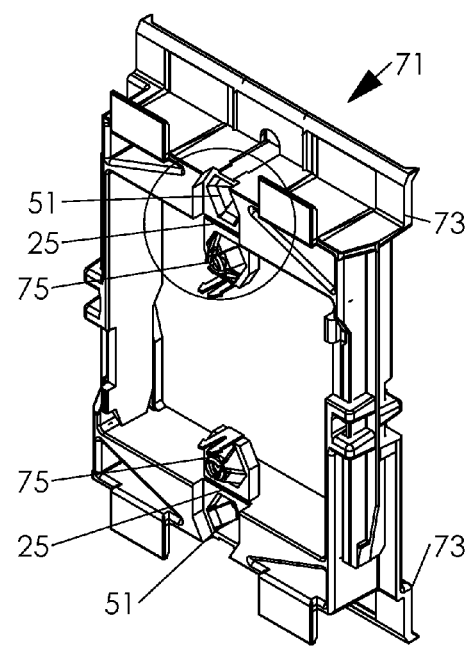
Figure 22C:
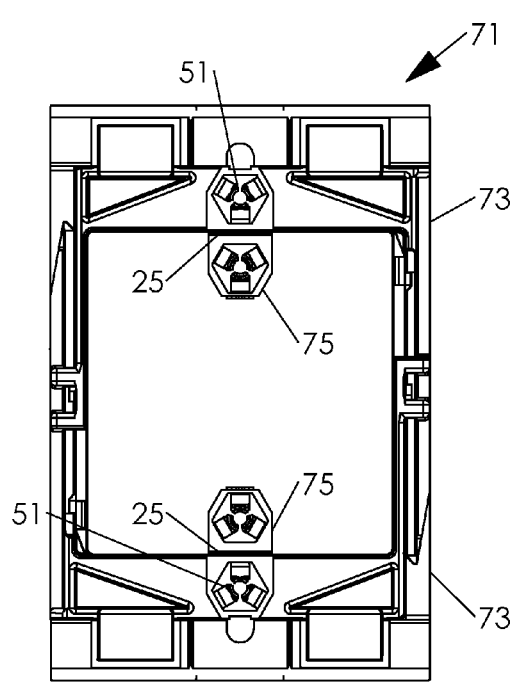
Figure 22D:
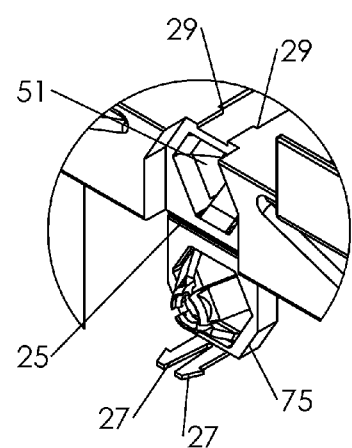
FIG. 22d is a detail view taken from FIG. 22b.
Figure 22E:
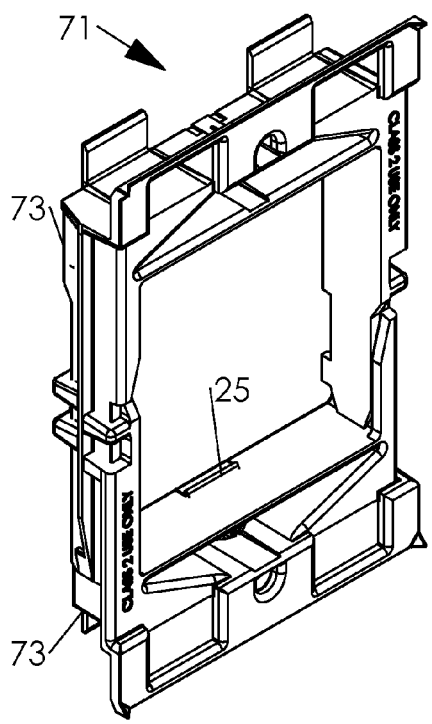
FIGS. 22e-22g are front and back perspective and front views, respectively, of the rework low voltage bracket shown in FIGS. 22a-22c with secondary ratchet threads snapped in place.
Figure 22F:
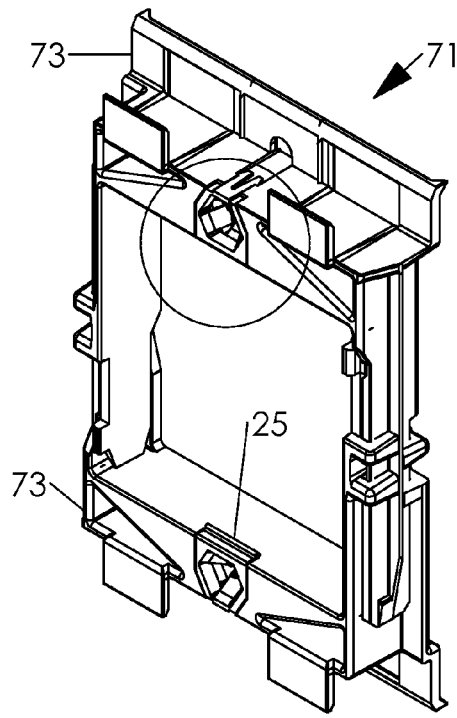
Figure 22G:
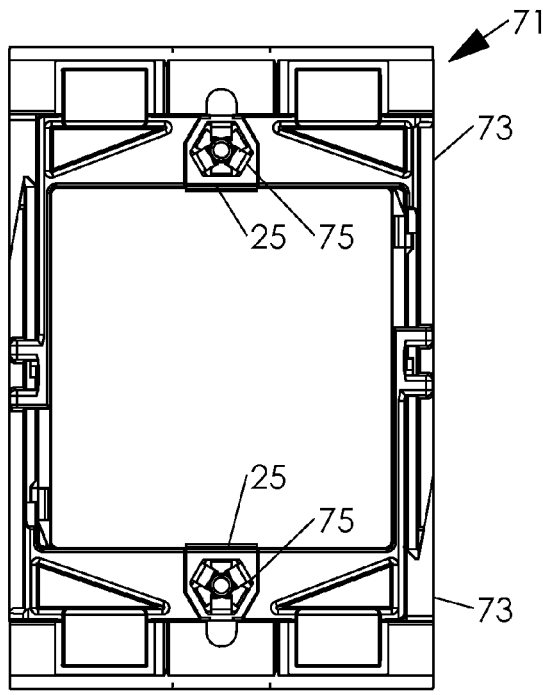
Figure 22H:
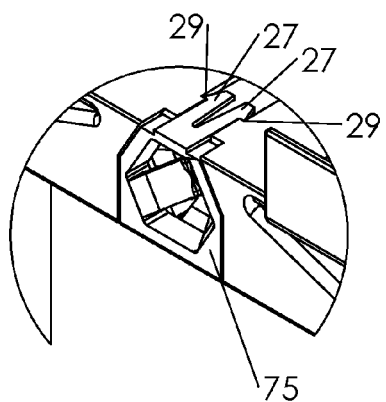
FIG. 22h is a detail view taken from FIG. 22f.
Figure 23A:
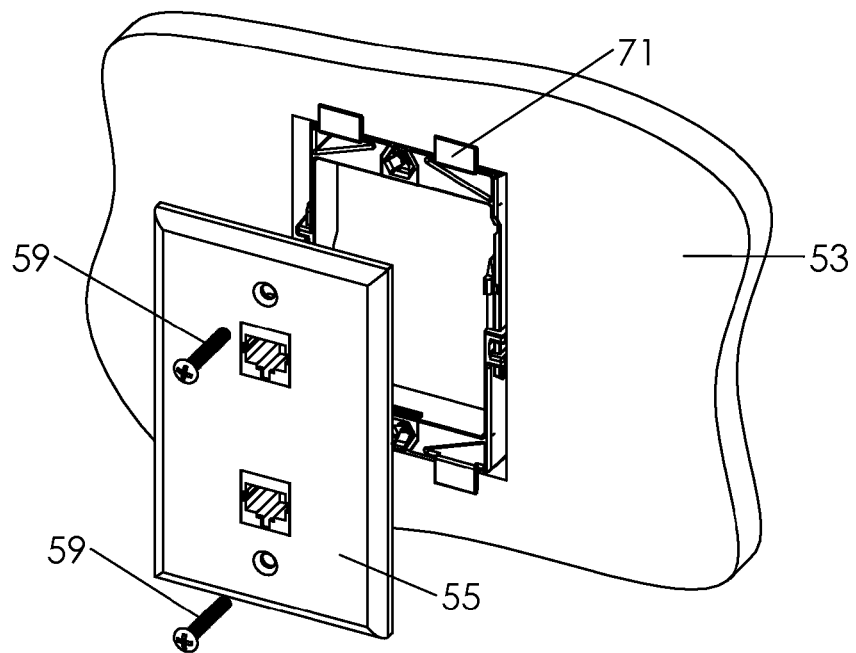
Figure 23B:
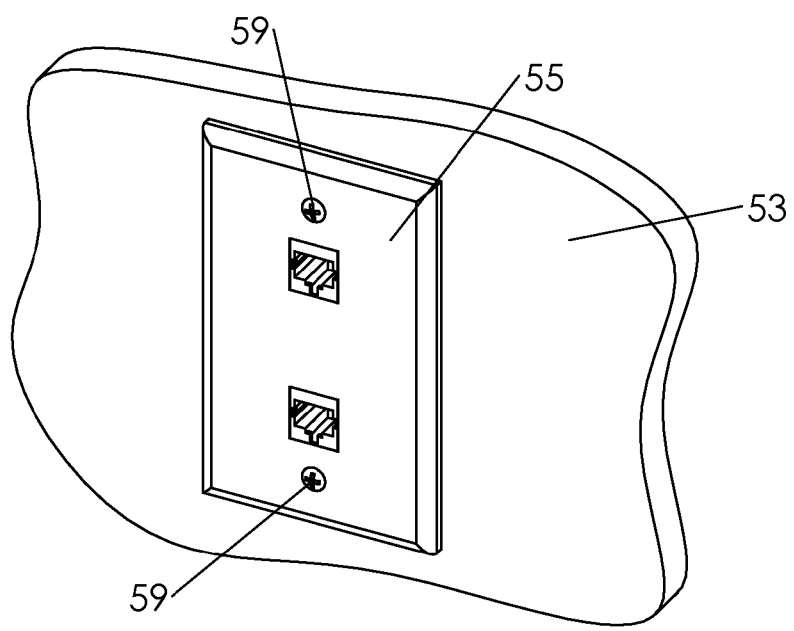
Figure 24A:
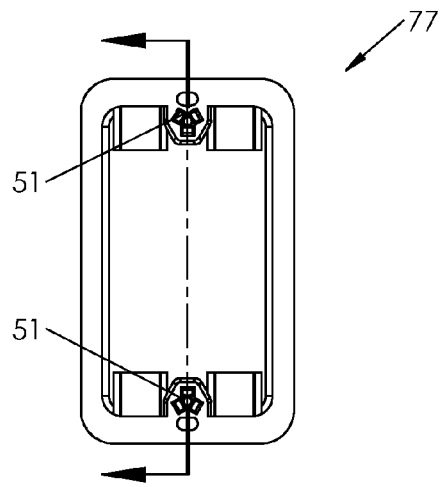
FIG. 24a is a front view of an electrical box comprising speed nut ratchet threads.
Figure 24B:
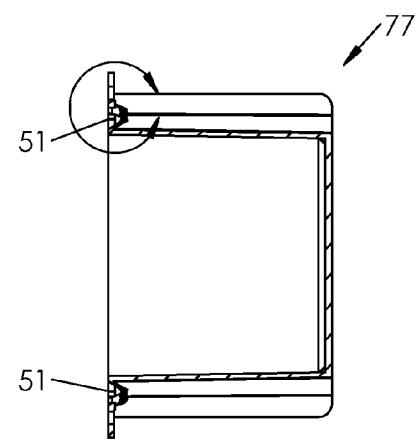
Figure 24C:
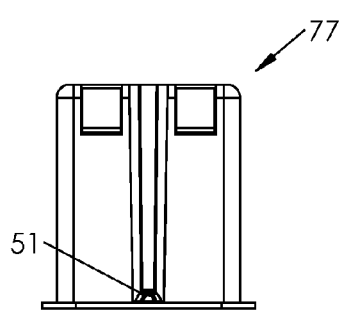
Figure 24D:
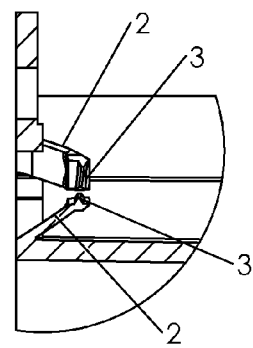
FIG. 24d is a detail view taken from FIG. 24b.
Figure 24E:
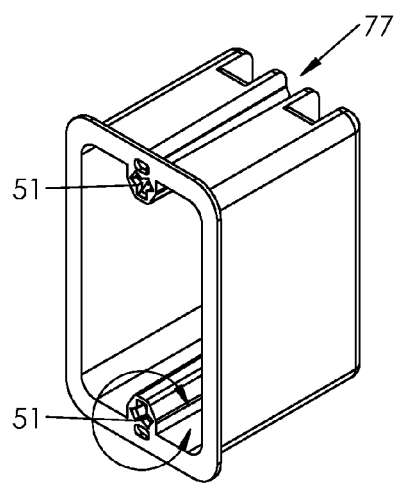
Figure 24F:
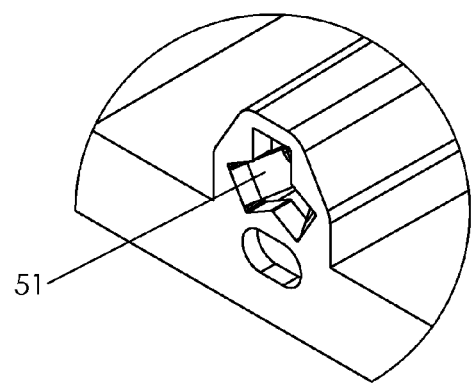
FIG. 24f is a detail view taken from FIG. 24e.

FIGS. 20a-20b show two HDMI devices 60 mounted on low voltage device plate 61 fastened to rework bracket 49, mounted in drywall 53, using fasteners 59 into ratchet threads 51. Cover plate 63 is held in the conventional manner with fasteners 65 into holes 67 of device 61.

FIGS. 21a-21c show an alternative rework bracket 68 made up of two half frames 69. Half frame 69 has ratchet thread with three threads 70. Ratchet thread 70 is similar to speed nut 17 shown in FIGS. 5a-5e. Ratchet thread 70 is made up of three arms 2 with partial triple thread 19 at the end of each. A rotating or collapsible retractable core is likely required to be able to injection mould half frame 69.

Rework low voltage bracket with double ratchet thread 71, shown in FIGS. 22a-22d and FIGS. 23a-23e, is similar to rework bracket 49 in FIGS. 18a-18d. Bracket 71 is made up of two half frames 73 each with ratchet thread 51 and secondary ratchet thread 75. FIGS. 22e-22j show bracket 71 with secondary ratchet threads flexed at hinge 25 and held in place with cantilever snap beams 27 retained by catch surface 29. In this position ratchet thread 51 and secondary ratchet thread 75 are concentric in the same way as it is on speed nut 34 of FIGS. 11a-11j. Secondary ratchet thread 75 increases concentricity of screw 59 and increases the number of partial threads 3 engaging screw threads 11 increasing pullout strength and reducing the likelihood of stripping. Frame 73 is injection molded from a two part tool without special action.

FIGS. 24a-24f show electrical box 77 with integral ratchet threads 51. A similar electrical box with an integral speed nut was disclosed in application Ser. No. 13/745,034, filed by the present inventors on Jan. 18, 2013, entitled "Electrical Box and Sleeve". FIGS. 20a and FIGS. 21a-21b. Similar to previous embodiments, the device comprises arms 2 and partial threads 3. Electrical box 77 is injection molded from a two part tool without special action.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, while a sixty degree offset between arms of multiple threads has been exemplified, the concepts of the present disclosure are applicable to other configurations. Similarly, although three fastener segment arms have been exemplified, a different plurality of segment arms are contemplated.

What is claimed is:

1. A fastener device comprising:
a body having a surface comprising a central opening; and
a plurality of separated flexible segments, each segment comprising an arm of rectangular cross section that extends inwardly from the central opening of the surface, the distal end of the segment comprising an internal threaded portion;
wherein the rectangular cross section of the arm is substantially uniform between the surface and the distal end portion.

2. A fastener device as recited in claim 1, wherein each arm extends at an acute angle downward from the surface.

3. A fastener device as recited in claim 2, wherein the segments are evenly spaced circumferentially about the central opening.

4. A fastener device as recited in claim 3, wherein the body further comprises a plurality of inwardly projecting centering portions.

5. A fastener device as recited in claim 4, wherein the centering portions are respectively spaced circumferentially between adjoining segments.

6. A fastener device as recited in claim 5, wherein the centering portions are flush with the surface of the body.

7. A fastener device as recited in claim 6, wherein the width of the centering portions respectively decreases inwardly in the radial direction from the opening.

8. A fastener device as recited in claim 3, further comprising:
a flexible tab having a barbed end and a notch, wherein the tab and notch are configured for latching the body to a second fastener body.

9. A fastener device as recited in claim 1, wherein the flexible segments are configured to form a single thread engageable with an externally threaded fastener.

10. A fastener device as recited in claim 1, wherein the flexible segments are configured to form a plurality of threads engageable with an externally threaded fastener.

11. A fastener device comprising:
a body having a surface comprising a central opening;
a plurality of separated flexible segments extending inwardly from the central opening of the surface and evenly spaced circumferentially about the central opening, the distal end of each segment comprising an internal threaded portion; and
a plurality of inwardly projecting centering portions respectively spaced circumferentially between adjoining segments.

12. A fastener device as recited in claim 11, wherein each segment extends downwardly from the surface and the centering portions are flush with the surface of the body.

13. A fastener device as recited in claim 12, wherein the width of the centering portions respectively decreases inwardly in the radial direction from the opening.

14. A fastener device as recited in claim 11, wherein the flexible segments are configured to form a single thread engageable with an externally threaded fastener.

15. A fastener device as recited in claim 12, wherein the flexible segments are configured to form a plurality of threads engageable with an externally threaded fastener.

16. A fastener device comprising:
a first body having a surface comprising an opening circumscribing a central axis;
a plurality of separated flexible segments extending inwardly and downwardly from the opening at the surface, the segments spaced circumferentially about the central opening, wherein the distal end of each segment comprises an internal threaded portion; and
a second body overlaying the first body surface, the second body comprising a cylindrical opening having an axis coincident with the central axis, the diameter of the cylindrical opening less than the a radial distance across the first body surface opening;
wherein the cylindrical opening is configured to align an externally threaded fastener engageble with the threaded portions of the segments.

17. A fastener device as recited in claim 16, wherein cylindrical opening of the second body extends to the distal ends of the segments of the first body.

18. A fastener device as recited in claim 17, further comprising a hinge coupling the second body to the first body.

19. A fastener device as recited in claim 18, wherein outer circumferences of the first and second bodies are coincident.

20. A fastener device as recited in claim 16, wherein the first body further comprises a notch beneath the surface; and
the second body further comprises a flexible tab having a barbed end;
wherein the second body is latched to the first body upon mating of the flexible tab with the notch.

21. A fastener device as recited in claim 20, wherein the first body comprises a wall interior of its outer circumference, and the notch comprises a platform extending from the wall.

22. A fastener device as recited in claim 16, further comprising a third body overlaying the first body remote from the first body surface, wherein outer circumferences of the first body, second body and third body are coincident.

23. A fastener device as recited in claim 22, wherein the third body comprises a cylindrical opening having an axis coincident with the central axis, the diameter of the cylindrical opening less than the a radial distance across the first body surface opening and aligned with the cylindrical opening in the second body.

24. A fastener device as recited in claim 23, further comprising a first hinge coupling the second body to the first body and a second hinge coupling the third body to the first body.

25. A fastener device as recited in claim 22, wherein
the second body further comprises a flexible tab having a barbed end; and
the third body further comprises a flexible tab having a barbed end.

26. A fastener device as recited in claim 25, wherein the first body further comprises:
a wall interior of its outer circumference, the wall comprising a notch, the notch configured for latching the barbed end of the second body.

27. A fastener device as recited in claim 26, wherein the first body further comprises a notch at its outer circumference, the notch configured for latching the barbed end of the third body.

28. A fastener device comprising:
a first body having a surface comprising an opening circumscribing a central axis;
a plurality of separated flexible segments extending inwardly and downwardly from the opening at the surface, the segments spaced circumferentially about the central opening, wherein the distal end of each segment comprises a first internal threaded portion to collectively form a first internal thread; and
a second body overlaying the first body surface, the second body comprising:
a first surface in contact with the surface of the first body and comprising an opening circumscribing the axis;
a second surface opposite the first surface, the second surface comprising an opening circumscribing the axis; and
a plurality of separated flexible segments spaced circumferentially about the second surface opening and extending inwardly therefrom.

29. A fastener device as recited in claim 28, wherein each segment of the second body comprises an internal threaded portion at a distal end thereof and the segments of the second body extend inwardly through the opening of the first body surface collectively to form a second internal thread.

30. A fastener device as recited in claim 29, wherein the plurality of segments of the first body is circumferentially displaced, respectively, from the plurality of segments of the second body.

31. A fastener device as recited in claim 28, further comprising a hinge coupling the second body to the first body.

32. A fastener device as recited in claim 31, wherein outer circumferences of the first and second bodies are coincident.

33. A fastener device as recited in claim 32, wherein the first body further comprises a notch beneath the surface; and
the second body further comprises a flexible tab having a barbed end;
wherein the second body is latched to the first body upon mating of the flexible tab with the notch.

34. A fastener device as recited in claim 33, wherein the first body further comprises a notch at its outer circumference, the notch configured for latching the barbed end of the second body.

35. A fastener device:
a plurality of bodies, each body comprising:
a surface having a central opening;
a plurality of separated flexible segments, each segment comprising an arm of rectangular cross section that extends inwardly from the central opening of the surface, the distal end of the segment comprising an internal threaded portion; and
a flexible tab having a barbed end and a notch;

wherein the tab and notch are configured for latching each of the plurality of bodies to a another said fastener body, thereby to form a stacked multithreaded structure engageable with an externally threaded fastener.

* * * * *

UNITED STATES PATENT AND TRADEMARK OFFICE
CERTIFICATE OF CORRECTION

PATENT NO. : 8,950,993 B2  
APPLICATION NO. : 13/875949  
DATED : February 10, 2015  
INVENTOR(S) : Gagne et al.

Page 1 of 1

It is certified that error appears in the above-identified patent and that said Letters Patent is hereby corrected as shown below:

On the title page item 72 Inventors: Jean-Guy Gagne, Etobicoke
Delete "James W. Rodgers, Toronto", Insert --James W. Rogers, Toronto--

Signed and Sealed this
Fourteenth Day of June, 2016

Michelle K. Lee
*Director of the United States Patent and Trademark Office*